United States Patent
Arhab et al.

(10) Patent No.: US 6,688,441 B1
(45) Date of Patent: Feb. 10, 2004

(54) HYDROKINETIC COUPLING APPLIANCE

(75) Inventors: Rabah Arhab, Saint-Brice-Sous-Foret (FR); Alexandre Depraete, Amiens (FR); Daniel Satonnet, Amiens (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/806,029

(22) PCT Filed: Jul. 27, 2000

(86) PCT No.: PCT/FR00/02156

§ 371 (c)(1), (2), (4) Date: Mar. 26, 2001

(87) PCT Pub. No.: WO01/07800

PCT Pub. Date: Feb. 1, 2001

(30) Foreign Application Priority Data

Jul. 27, 1999  (FR) ............................................. 99 09739
Jul. 27, 1999  (FR) ............................................. 99 09740
Oct. 5, 1999   (FR) ............................................. 99 12402

(51) Int. Cl.$^7$ ............................................. F16D 33/00
(52) U.S. Cl. .................................. 192/3.29; 192/70.18
(58) Field of Search ............................ 192/3.28, 3.29, 192/70.16, 70.17, 70.18

(56) References Cited

U.S. PATENT DOCUMENTS

| | | | | |
|---|---|---|---|---|
| 4,311,067 A | * | 1/1982 | Froumajou | 74/718 |
| 4,635,775 A | * | 1/1987 | Kohler | 192/70.18 |
| 4,828,083 A | * | 5/1989 | Naudin | 192/70.18 |
| 5,590,750 A | * | 1/1997 | Graton et al. | 192/3.29 |
| 5,641,047 A | * | 6/1997 | Dequesnes et al. | 192/70.18 |
| 5,826,690 A | * | 10/1998 | Maingaud et al. | 192/70.18 |
| 6,065,577 A | * | 5/2000 | Arhab et al. | 192/70.18 |
| 6,193,036 B1 | * | 2/2001 | Arhab et al. | 192/3.29 |
| 6,280,333 B1 | * | 8/2001 | Thevenon | 192/3.29 |

FOREIGN PATENT DOCUMENTS

| | | |
|---|---|---|
| DE | 2942043 | 5/1981 |
| FR | 2748539 | 11/1997 |

* cited by examiner

Primary Examiner—Jack Lavinder
Assistant Examiner—Thomas J. Williams
(74) Attorney, Agent, or Firm—Liniak, Berenato & White

(57) ABSTRACT

A hydrokinetic appliance (10), in particular for a motor vehicle, comprising a housing (12) provided with an annular axial wall (13) and a front transverse wall (18), wherein the housing (12) is designed to be linked in rotation to an input shaft, which includes a turbine wheel (40) housed inside the housing (12) and integral with a hub (46), capable of being coupled in rotation with an output shaft, and wherein a locking clutch comprises a rear piston (30) axially mobile relative to the front transverse wall (18) of the housing (12). The rear piston (30) is coupled in rotation to the annular axial wall (13) of the housing (12) by an axially resilient device (64).

22 Claims, 17 Drawing Sheets

HYDROKINETIC COUPLING APPLIANCE

INTERNATIONAL PATENT APPLICATION NO. PCT/FR00/02156, PUBLICATION NO. WO01/07800A1

The present invention relates to hydrokinetic coupling apparatus for a motor vehicle.

The present invention relates more particularly to hydrokinetic coupling apparatus of the type which is described in the document FR-A-2 748 539. In that document the apparatus includes an input element in the form of a casing having a generally transversely oriented wall and an output element comprising a turbine wheel assembled with a hub, which are together mounted inside the casing. A piston is located between this assembly and the transverse wall. The piston is mounted for axial movement with respect to the transverse wall and it is coupled in rotation to the latter.

The input element is arranged to be coupled in rotation through its transverse wall to a driving shaft, while the output element is arranged to be coupled in rotation to a driven shaft through its hub.

The piston has at its outer periphery a surface called the second surface, while the transverse wall has a first surface facing the second surface. The surfaces in this case are friction surfaces, with one or more friction discs being interposed between the two surfaces.

By varying the pressure on either side of the piston, the latter is displaced axially in one direction or the other. The piston is accordingly movable axially with respect to the hub.

In the said document, the friction disc is provided at its outer periphery with lugs which extend outside the piston so as to mesh with an input member of a torsion damper, which includes an output member having a damper plate coupled to the hub. Circumferentially acting elastic members act between the input and output members, which are so configured as to receive the elastic members, which lie radially outside the piston and the surfaces.

It can be desirable to increase the external diameter of the surfaces, which is not possible having regard to the presence of the elastic members.

Accordingly, an object of the present invention is to increase the outside diameter of the surfaces, and to do so in an inexpensive way.

According to the invention, hydrokinetic coupling apparatus, especially for a motor vehicle, of the type which comprises a casing having an annular axial wall and a transverse front wall, of the type in which the casing is arranged to be coupled in rotation to a driving shaft, of the type that includes a turbine wheel mounted inside the casing and fixed to a hub which is arranged to be coupled in rotation to a driven shaft, of the type in which the rear face of the transverse front wall of the casing includes a first surface, of the type in which a lock-up clutch is interposed operatively between the turbine wheel and the transverse front wall so as to couple them together releasably, and of the type in which the lock-up clutch comprises at the rear a piston which is movable axially with respect to the transverse front wall of the casing, and which carries on its front face a second surface facing the first surface, is characterised in that the piston is coupled in rotation to the annular axial wall of the casing through an axially elastic device.

Thanks to the invention it is possible to increase the outside diameter of the surfaces, because there is no longer any restriction due to the presence at the outer periphery of the transverse wall of the casing of a damping device or a device for coupling the piston to the casing.

According to further features of the invention:

the second surface is situated in the vicinity of the outer periphery of the piston;

the axially elastic device comprises at least one support member coupled in rotation and axially to the axial annular wall of the casing and comprising a transverse plate element, and comprises at least one elastic member which is interposed axially between the piston and the transverse plate portion of the support member, and the piston includes means for coupling it in rotation with the support member;

the mean radius of intervention of the elastic member is smaller than the external radius of the second surface;

the axially elastic device comprises a plurality of support members spaced apart circumferentially, in particular at regular intervals;

the axially elastic device comprises a single support member, the transverse plate portion of which constitutes an annular ring;

the piston includes at its outer periphery an axial skirt which extends towards the rear and includes notches, and the transverse plate portion or portions of the support member or of the respective support member, constitute annular ring sectors, such that the annular ring sectors are received in the notches of the axial skirt of the piston, whereby to enable the support members to come into abutment against the edges of the notches in the piston;

the transverse plate portion of the support member has notches, and the piston includes pads on its rear face facing the said notches, whereby the pads of the piston are received in the notches of the transverse plate portion so as to couple the piston in rotation with the support member;

the coupling in rotation between the piston and the support member or members includes a circumferential clearance;

the axially elastic device comprises axially elastic tongues, the opposed ends of which are secured respectively on the piston and on the transverse plate portion of the support member or members;

the tongues exert a preloading force on the piston in the direction of locking of the clutch;

the magnitude of the preloading force is adjusted according to the axial positioning of the transverse plate portion;

the tongues tend to retain the piston in the unlocked position of the clutch;

the tongues are spaced apart circumferentially at regular intervals;

the tongues are oriented tangentially;

each tongue includes a first point for fastening on the rear face of the piston;

the first fastening point is defined on a convex boss on the rear face of the piston;

the tongues are formed integrally with the transverse plate portion or portions of the or the respective support member;

each tongue has a second point for fastening on the front face of the transverse plate portion or portions of the or the respective support member;

the second fastening point of the tongue is in facing relationship with a concave boss on the rear face of the piston;

the transverse plate portion of the support member is formed with cut-outs in facing relationship with a first fastening point of each tongue, the second fastening point of which is situated in the vicinity of the circumferential terminal edge of the cut-out;

the axially elastic device comprises at least one compression spring in axial engagement, firstly on the rear face of the piston and secondly on the front face of the transverse plate portion or portions of the or the respective support member, whereby the spring exerts a preloading force on the piston in the direction of locking of the clutch;

the axially elastic device comprises a single annular spring of the helical type or of the conical type or of the corrugated type;

the axially elastic device comprises a plurality of compression springs which are spaced apart circumferentially at regular intervals;

each compression spring is of the helical type, and at least one end of each spring is hooked on a retaining pad formed in projecting relationship on the front face of the transverse plate portion or portions of the or the respective support member and/or on the rear face of the piston;

each compression spring is a spring sector of the conical ring type or corrugated type;

the transverse plate portion or portions of the or the respective support member include at their inner periphery an axial skirt which extends forward so as to retain the springs radially inwards;

the transverse plate portion or portions of the or the respective support member includes pairs of circumferentially opposed abutments, which extend axially forwards to retain the spring sectors circumferentially;

each spring sector of the corrugated type is fixed through its circumferential ends on the transverse plate member or members of the or the respective support members;

the axial annular wall of the casing includes transverse lugs which extend towards the axis and each of which has a notch, and the support member includes on its outer periphery transverse lugs, each of which has on its rear face a projecting boss facing a recess, whereby the support member is coupled in rotation with the axial wall of the casing by a bayonet type coupling;

the piston includes, in facing relationship with its rear face, at least one transverse intermediate plate which is fixed through its outer periphery on a peripheral annular skirt of the piston, whereby the elastic member is operatively interposed between each transverse intermediate plate and each support member;

the casing comprises a front shell and a rear shell, each of which includes an axial skirt, the two axial skirts defining the axial annular wall of the casing;

the transverse plate portion of each support member is fixed directly on the free rear end of the axial skirt of the front shell, or on the free front end of the axial skirt of the rear shell;

each support member comprises an annular axial crown or annular axial crown sectors, which are oriented towards the rear from the outer periphery of the transverse plate portion, for coupling the support member to the axial annular wall of the casing;

the crown or the crown sector of each support member is fixed on the axial skirt of the front shell or on the axial skirt of the rear shell;

the crown or the crown sector of each support member is fixed between the axial skirt of the front shell and the axial skirt of the rear shell;

a double-sided annular friction disc is arranged to be gripped between the first and second surfaces, and a torsion damper is interposed operatively between the annular friction disc and the hub of the turbine.

Further features and advantages of the invention will appear on a reading of the following detailed description, for an understanding of which, reference will be made to the attached drawings, in which.

In the following description, those elements which are identical or similar to each other will be given identical references. A front to rear orientation will be employed which corresponds to the orientation from left to right in the views seen in axial cross section and the perspective views.

In addition, for each embodiment only those elements will be described which are different from one embodiment to another.

Figure 1:
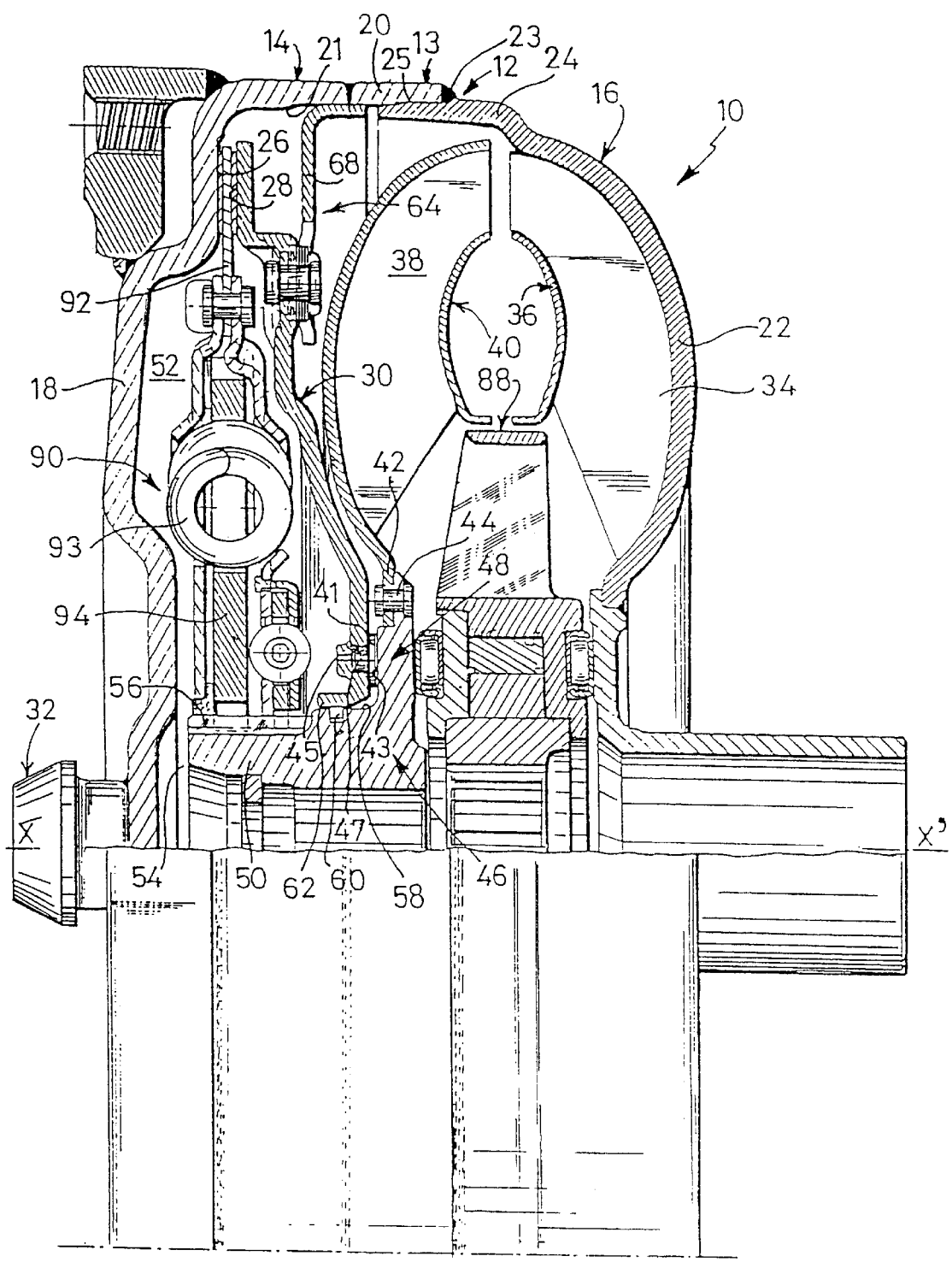
FIG. 1 is a half view, partly in axial cross section, showing a hydrokinetic coupling apparatus made in accordance with the invention in a first embodiment, in which the axially elastic device comprises axially elastic tongues, and in which the support member is secured by welding on the internal wall of the front axial skirt.

FIG. 1 shows a general view of a hydrokinetic coupling apparatus 10. The apparatus 10 comprises a casing 12 which consists in particular of a front shell 14 and a rear shell 16.

The front shell 14 has a transverse front wall 18 and an annular front axial skirt 20 which extends towards the rear.

The rear shell 16 defines a semi-toroidal annular rear envelope 22, and includes an annular rear axial skirt 24 which extends forward and which is received axially within the front axial skirt 20.

A transversely oriented first annular surface 26 is formed at the outer periphery of the inner face of the front transverse wall 18.

A transversely oriented second annular surface 28 is formed at the outer periphery of the front face of a piston 30 at the rear.

The surfaces 26 and 28 are integral, in this example, with the transverse front wall 18 and the piston 30 respectively. In another version, at least one of the surfaces 26 and 30 may be part of an additional component which is for example fixed by welding on the element concerned.

The piston 30 is mounted so that it can be displaced axially with respect to the front transverse wall 18, which has a central external centring nose 32 projecting axially and of generally tubular form.

The axial front skirt 20 is centred in the region of its free rear end on the free front end of the rear axial skirt 24. The front axial skirt 20 is therefore in intimate contact through its inner face 21 with the outer peripheral face 25 of the rear axial skirt 24, and is secured, in this case by means of a weld 23, on the rear axial skirt 24. The two axial skirts 20 and 24 thus constitute an axial annular wall 13 of the casing 12.

The vanes 34 of an impulse wheel 36 are secured internally on the semi-toroidal envelope 22. The vanes 34 face towards the vanes 38 of a turbine wheel 40, and the piston 30 is disposed axially between the turbine wheel 40 and the front transverse wall 18.

The said turbine wheel 40 has an internal annular ring 42, which may be of divided form, and through which it is secured, in this example by means of rivets 44, or in another version by welding, on the outer periphery of a hub 46 which extends axially forward and which is generally L-shaped in axial cross section.

It is on the transversely oriented portion 48 of the hub 46, in the form of a radial plate, that the ring 42 is fixed, while the axially oriented tubular portion 50 of the hub 46 has internal splines which couple the hub 46, and therefore the turbine wheel 40, in rotation with a driven shaft (not shown).

The driven shaft is, in a known way, provided with a central duct for feeding a hydraulic control chamber 52 which is bounded axially by the piston 30 and the transverse front wall 18, and radially, and internally, by the axial portion 50 of the hub 46.

To this end, at least one passage 54 exists between the free end of the axial portion 50 and the front transverse wall 18, for passage of the control fluid, oil in this case, that comes from the duct in the driven shaft.

The axial portion 50 is generally tubular in form and it has external splines 56 in the region of its free front end.

The axial portion 50 has, between the radial plate 48 and splines 56, an external smooth surface 58, the diameter of which is slightly greater than that of the splines 56 so that the axial portion 50 is of stepped diameter.

A ring seal 60 is fitted in a groove formed in the surface 58. This seal 60 co-operates with an axially oriented sleeve element 62 which is part of the piston 30 at its inner periphery. In this way, sealing is obtained in this region.

In accordance with the features of the invention, the hydrokinetic coupling apparatus 10 includes an axially elastic device 64 which couples the piston 30 in rotation to the annular axial wall 13 of the casing 12.

Figure 2:
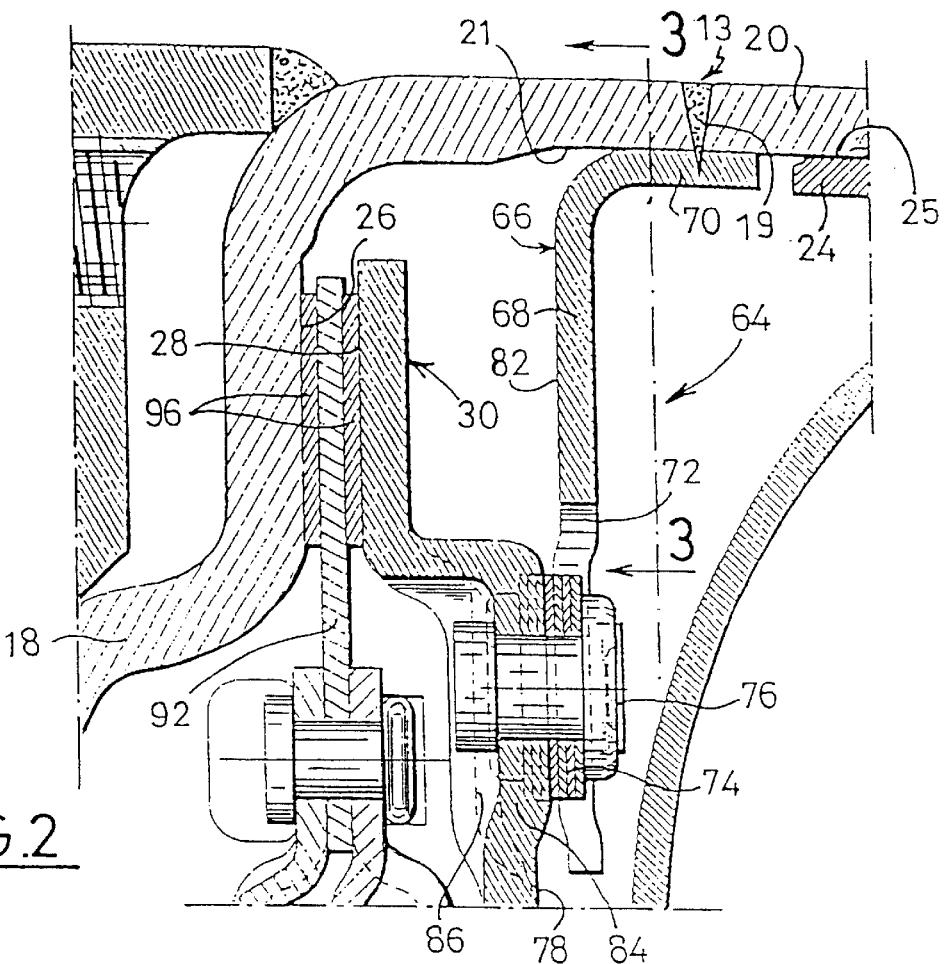
FIG. 2 is a view in axial cross section, on a larger scale, of the axially resilient device of the hydrokinetic coupling apparatus in FIG. 1.

FIG. 2 shows on a larger scale the axially elastic device 64 in a first embodiment.

In the first embodiment of the invention, the axially elastic device 64 comprises a support member 66 which consists of a transverse annular plate portion 68 at the outer periphery of which there is a rearwardly oriented annular axial crown portion 70.

The support member 66 is fixed on the annular axial wall 13 of the casing 12, in this example by welding the annular axial crown portion 70 on the internal face 21 of the axial front skirt 20, to form a weld seam 19.

Welding of the annular axial crown portion 70 is for example of the laser type or the electrical type or the resistance welding type or the friction welding type.

In a modified embodiment (not shown) of the invention, the support member 66 is force fitted into the casing 12, or it is seamed in the casing 12.

Figure 3:
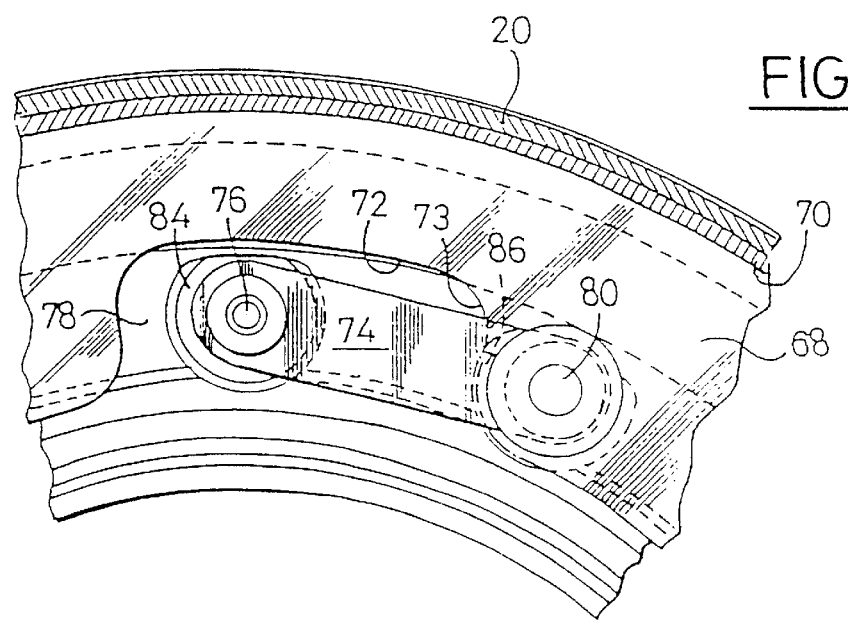
FIG. 3 is a front view, taken in cross section on the line 3–3 in FIG. 2, of the axially resilient device of the hydrokinetic coupling apparatus of FIG. 1.

The transverse plate portion 68 has cut-outs 72 at its inner radial periphery, one of which can be seen face on in FIG. 3.

The axially elastic device 64 also includes axially elastic tongues 74, the opposed tangential ends of which are fixed through a first fastening point 76 on the rear transverse face 78 of the piston 30, and, through a second fastening point 80, on the front transverse face 82 of the transverse plate portion 68.

The first fastening point 76 lies facing a cut-out 72 of the transverse plate portion 68, while the second fastening point 80 is located in the vicinity of a circumferential terminal edge 73 of the cut-out 72.

Fastening of the tongues 74 is achieved here by means of rivets, but it can be obtained in other known ways.

It is noted that the rear face 78 of the piston 30 includes, in the region of the first fastening point 76, a convex boss 84 which projects in relief axially towards the rear, and, facing the second fastening point 80, a concave boss 86, the object being to limit the axial size of the device 64.

The number of tongues 74 depends on the application, these being spaced apart circumferentially at regular intervals in several sets of tongues 74, in which each set comprises at least one tongue 74 in this example. The device 64 may for example have three sets of tongues 74.

The tongues 74, which in this case are oriented generally tangentially, may be oriented transversely, being for example triangular or rectangular.

In all cases the piston 30, radially inside its surface 28, matches the form of the turbine wheel 40 and hub 46 so as to reduce the size of the hydrokinetic coupling apparatus 10, which consists of the turbine wheel 40, impulse wheel 36, piston 30, hub 46 and a torsion damper 90, which in this example is of a standard type.

The hydrokinetic coupling apparatus 10 has an axis X–X' of axial and rotational symmetry. In this example the apparatus 10 also includes a reaction wheel 88 so as to constitute a torque converter in the known way.

The casing 12 is sealed and filled with oil.

The torsion damper 90 is interposed between the piston 30 and the front transverse wall 18, so as to filter out vibrations, the damper 90 acting disengageably between the piston 30 and hub 46.

More precisely, the damper 90 in this case is of the two-stage type, and it includes an annular friction disc 92 which is arranged to be gripped axially between the surfaces 26, 28.

The friction disc 92 is coupled, through a first elastic damping stage which in this example consists of circumferentially oriented helical compression springs 93, to a central damper plate 94 which is splined internally for mounting on the external splines 56 of the hub 46. The damper plate 94 is in mesh with the hub 46, in this case with a circumferential clearance.

The friction disc 92 is also coupled, through a second elastic damping stage which in this example consists of circumferentially oriented helical compression springs 95, to a lateral damper plate 97 which is splined internally for fitting without any circumferential clearance on the splines 56 of the hub 46.

Two-stage torsion dampers are well known in the state of the art, and the two damping stages will not be described in any greater detail here.

As will have been understood and as is well known, by varying the pressure on either side of the piston 30, for example by varying the pressure in the hydraulic control chamber 52 through the feed duct in the driven shaft and through the passage 54, the piston 30 is displaced forward or backward so that, in one case, it grips the friction disc 92 between the surfaces 26, 28, and in the other case it releases the friction disc 92.

When the friction disc 92 is gripped, the lock-up clutch which includes the surfaces 26, 28 and the torsion damper 90 is said to be engaged or bridged, so that the rotary driving motion is transmitted directly from the driving shaft (not shown), which is for example the crankshaft of a motor vehicle in the case of application to a motor vehicle, to the driven shaft, through the lock-up clutch without any relative sliding movement between the turbine wheel 40 and impulse wheel 36. In particular, this reduces the fuel consumption of the vehicle.

When the friction disc 92 is released, the lock-up clutch is said to be disengaged or unbridged, so that the rotary driving movement is transmitted from the driving shaft to the driven shaft through the torque converter by virtue of the flow of oil between the vanes 34, 38 of the impulse wheel 36 and turbine wheel 40. This is, in particular, what happens on starting of the motor vehicle.

The tongues 74 enable the piston 30 to move axially with respect to the front transverse wall 18 when the lock-up clutch is shifting from one position to the other.

Preferably, but without limitation of the invention, the tongues 74 are so mounted that they exert an axial preloading force on the piston 30 in the direction of bridging of the lock-up clutch. In consequence, in order to unbridge the lock-up clutch, the pressure in the hydraulic control chamber 52 is increased.

It will be noted that the magnitude of the preloading force exerted on the piston 30 can be adjusted as a function of the axial positioning of the transverse plate portion 68. The further forward the transverse plate portion 68 is located, the greater is the preloading force.

In a modified embodiment of the invention, the tongues 74 are so mounted that they tend to retain the piston 30 in its unbridged position.

The tongues 74 can of course be fixed by any known means on the piston 30 and support member 66. For example, they can be secured by means of rivets, the bodies of which are extruded on the piston 30 or support member 66, or by welding, or by screw fastening.

In this example the friction disc 92 carries front and rear friction liners 96, secured on each of its opposed transverse faces. In another version, the liners 96 are fixed to the surfaces 26, 28, which are therefore fastening surfaces. In a further version, the friction disc 92 is embedded at its outer periphery within a friction liner. In yet another version, the friction disc 92 is in direct frictional contact against the surfaces 26, 28.

Preferably, the liner or liners 96 are provided with grooves extending from their inner periphery to their outer periphery to give good cooling, the grooves being in contact with the surfaces 26, 28 or with the friction disc 92.

The hydrokinetic coupling apparatus 10 made in accordance with the invention enables the torque transmission capacity of the driven shaft to be increased because of the increase in the mean radius of the surfaces 26, 28, which are no longer radially limited in size by the presence of a device on the outer periphery of the transverse front wall 18 of the front shell 14.

In addition, the invention reduces the number of components required, as compared with the state of the art, thus reducing the cost of the apparatus 10.

The use of an axially elastic device 64 such as that of the invention, which exerts a preloading force on the piston 30 in the direction of bridging of the lock-up clutch, enables a gripping force to be exerted on the friction disc 92 without application of any pressure on the piston 30.

A friction means 41 acts between a front transverse surface 43 formed on the radial plate portion 48 of the hub 46 and the piston 30, which is coupled releasably to the front transverse wall 18 through the second surface 28 which lies facing the first surface 26 as described above.

The friction means 41 prevents any direct contact taking place between the piston 30 and the transverse surface 43 of the hub 46, and limits axial displacement of the piston 30 towards the rear, thereby preventing the latter from coming into contact with the turbine wheel 40.

The friction means 41 comprises at least one friction element, preferably having a low coefficient of friction. This friction element is preferably of synthetic material such as plastics, which can with advantage be reinforced by fibres and/or balls such as glass fibres and/or balls.

It will be noted in FIG. 1 that the piston 30 is adjacent to the assembly of the turbine wheel 40 and hub 46, and is so configured as to carry the friction means 41, while the hub 46 has an axially oriented annular portion directed towards the front transverse wall 18 and surrounded by the piston 30, which is mounted for axial movement with respect to the said portion.

Thanks to this arrangement, the radial plate portion 48 of the hub 46 does not need to be given any additional machining operation, because the friction means 41 is carried by the piston 30.

Another result is that the mechanical strength of the plate portion 48 is preserved, and in addition the solution is simple and inexpensive because the piston 30, which is preferably made of metal, is a component which it is easy to configure.

All of this combines well with the damper 90, because the piston 30 is located axially between the damper 90 and the assembly of the turbine wheel 40 and hub 46, coming as close as possible to the said assembly, and in particular to the plate portion 48.

In addition, the piston 30 is coupled in rotation to the axial wall of the casing 12, which enables a radial clearance to be provided between the sleeve element 62 and the surface 58 so that there is no danger of the piston 30 jamming.

The piston 30 is in cooperation, through its sleeve element 62, only with the seal 60 which is mounted on the hub 46, so that the friction means 41 have a good surface of contact with the plate portion 48, since the tongues 74 and seal 60 enable the piston 30 to be displaced, in particular circumferentially, so that the surface contact between the friction means 41 and plate portion 48 is always maximised.

In this example, one of the means 41 in frictional engagement with the piston 30 has at least one projecting element which is engaged in a complementary hole 45 in the rear face 78 of the piston. This mating cooperation is simple and inexpensive to achieve, and enables the friction means 41 to be well centred while providing a rotary coupling.

The hole 45 is preferably blind, so that sealing of the chamber 52 is preserved. The blind hole 42 is preferably press-formed or extruded.

The friction means 41 consists of a ring which is arranged to make contact with a transverse surface 43 of the hub 46 formed on the plate portion 48 radially inside the fastening rivets 44.

The said transverse surface 43 faces forward.

The ring 41 has a plurality of bosses 47, each of which is engaged, in this example with axial and radial clearance, in a blind hole 45 formed locally by forward extrusion of the metal of the piston 30.

The bosses 47 and holes 45 are cylindrical, being of circular cross section here, but in modified versions they are of square cross section or of any other form.

The contact surface 43 between the plate portion 48 and ring 41 is maximised because of the mounting of the bosses 47 in the holes 45 with axial and radial clearance.

Figure 4:
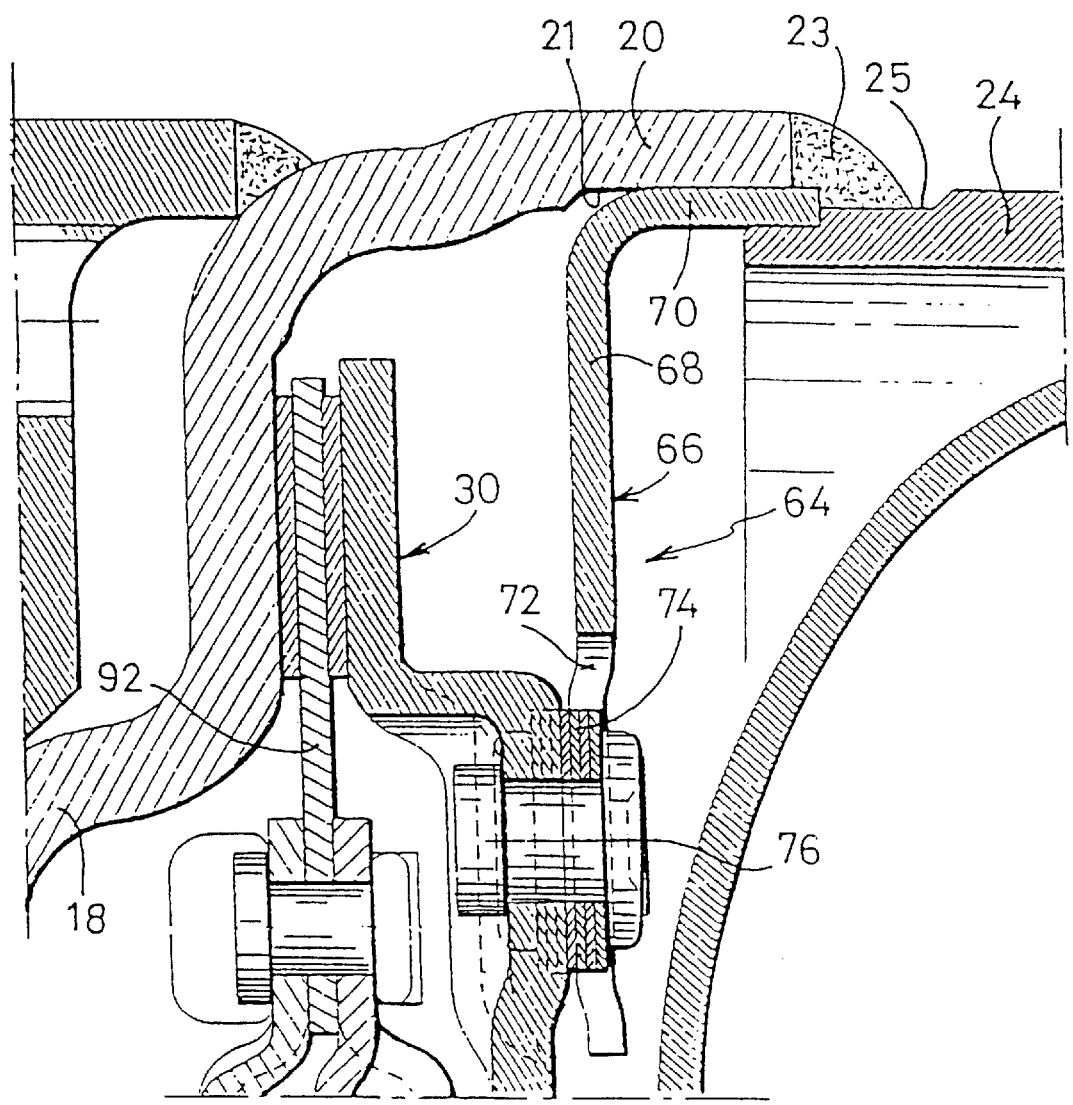
FIG. 4 is a view similar to that in FIG. 2, showing a second embodiment of the invention in which the support member is fitted and welded between the front axial skirt and the rear axial skirt of the casing.

FIG. 4 shows a second embodiment of the axially elastic device similar to the foregoing one, but in which the axial annular crown 70 is inserted axially and radially between the internal face 21 of the front axial skirt 20 and the outer face 25 of the rear axial skirt 24, so that these three elements are secured together, in this example by welding in a single weld seam 23.

Figure 5:
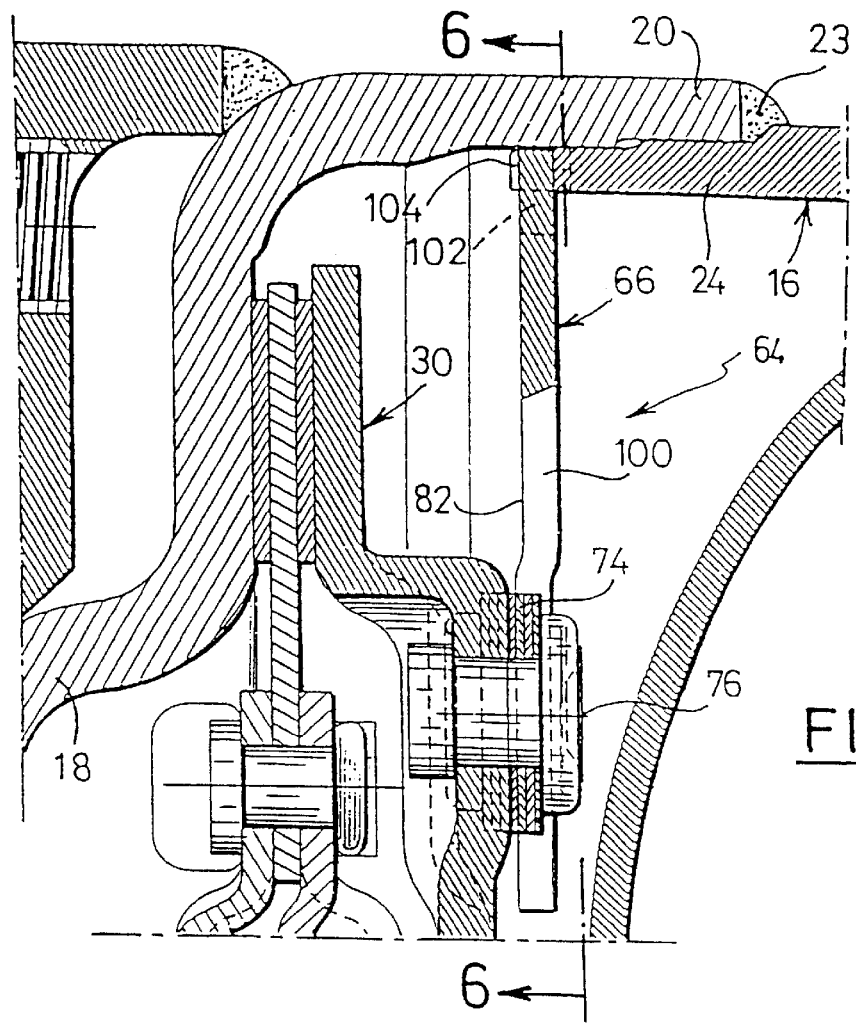
FIGS. 5 and 6 are views similar to those in FIGS. 2 and 3, showing a third embodiment of the invention in which the support members are fixed on the free front end of the rear axial skirt of the casing.
Figure 6:
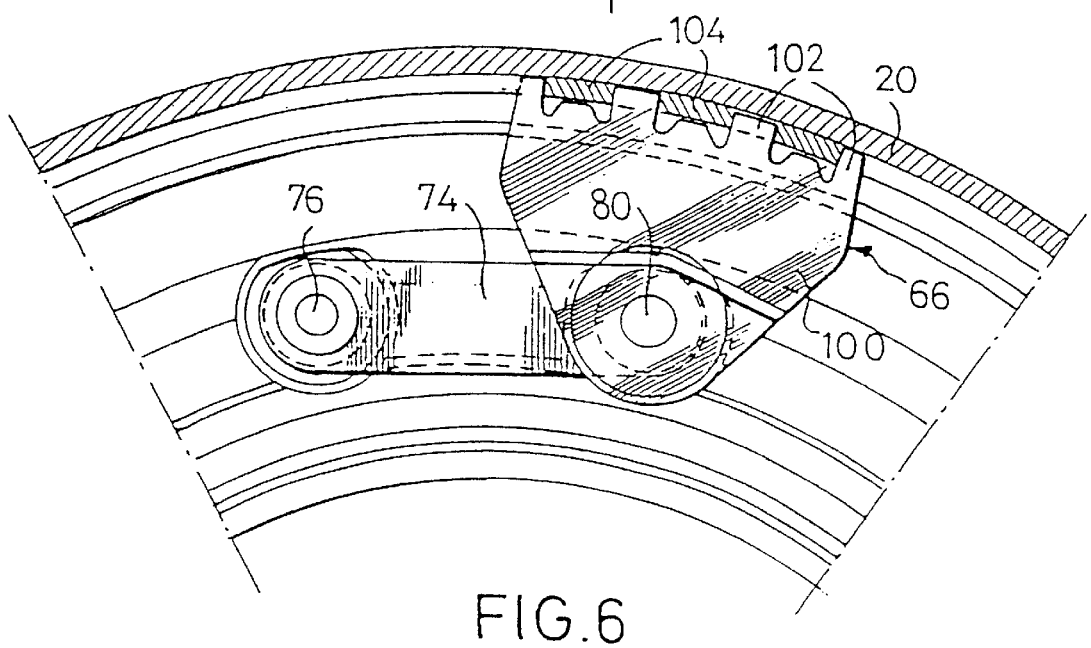

FIGS. 5 and 6 show a third embodiment of the axially elastic device which comprises a plurality of support members 66 defining lugs.

These support lugs 66 are preferably spaced apart circumferentially at regular intervals, and there are for example three of them.

It will be noted that in this embodiment, the support lugs 66 do not include the axial annular crown element 70 as in the previous versions.

Each support lug 66 comprises a sector 100 of the annular transverse plate portion 68. The sector 100 of the annular transverse plate portion 68 has at its outer periphery crenellations 102 which fit between complementary lugs 104 extending axially forward from the front free end of the rear axial skirt 24 of the rear shell 16.

Fastening of the crenellations 102 on the lugs 104 may be obtained for example by seaming or welding.

Each transverse plate sector 100 includes on its front transverse face 82 a second fastening point 80 for an axially elastic tongue 74. Assembly of the tongue 74 to the second fastening point 80 is of the same type as that in the first embodiment.

Figure 7:
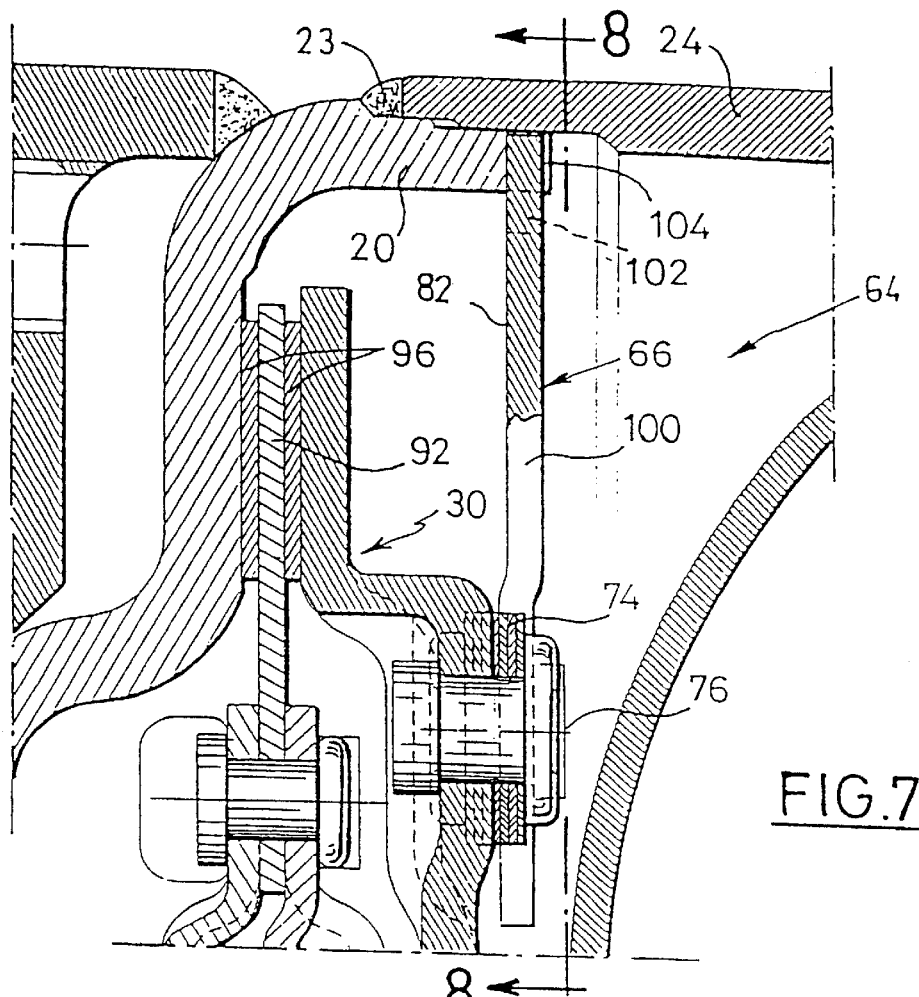
FIGS. 7 and 8 are views similar to those in FIGS. 2 and 3, but show a fourth embodiment of the invention in which the support members are fixed on the free rear end of the front axial skirt of the casing.
Figure 8:
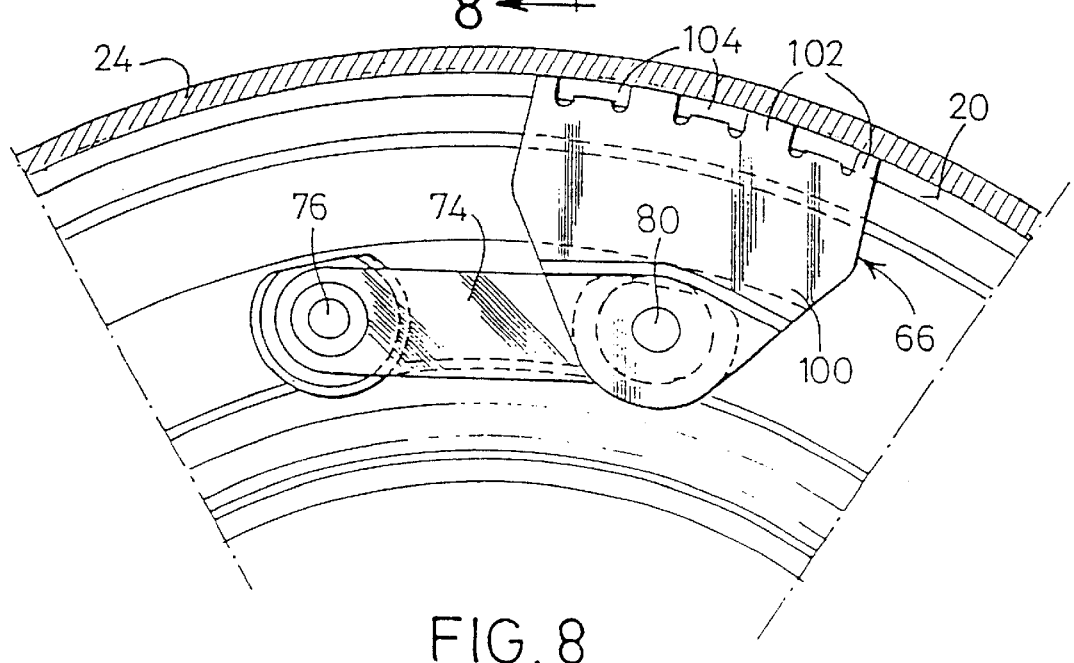

The fourth embodiment of the axially elastic device which is shown in FIGS. 7 and 8 is similar to the second embodiment.

A first difference is that the rear axial skirt 24 is centred in the region of its free end around the free rear end of the front axial skirt 20, and is secured on the front axial skirt 20, by welding in this example.

A second difference is that the lugs 104 are part of the free rear end of the front axial skirt 20. Thus, the support lugs 66, which are identical to those in the second embodiment, are engaged through their crenellations 102 between the lugs 104 of the front axial skirt 20.

Figure 9:
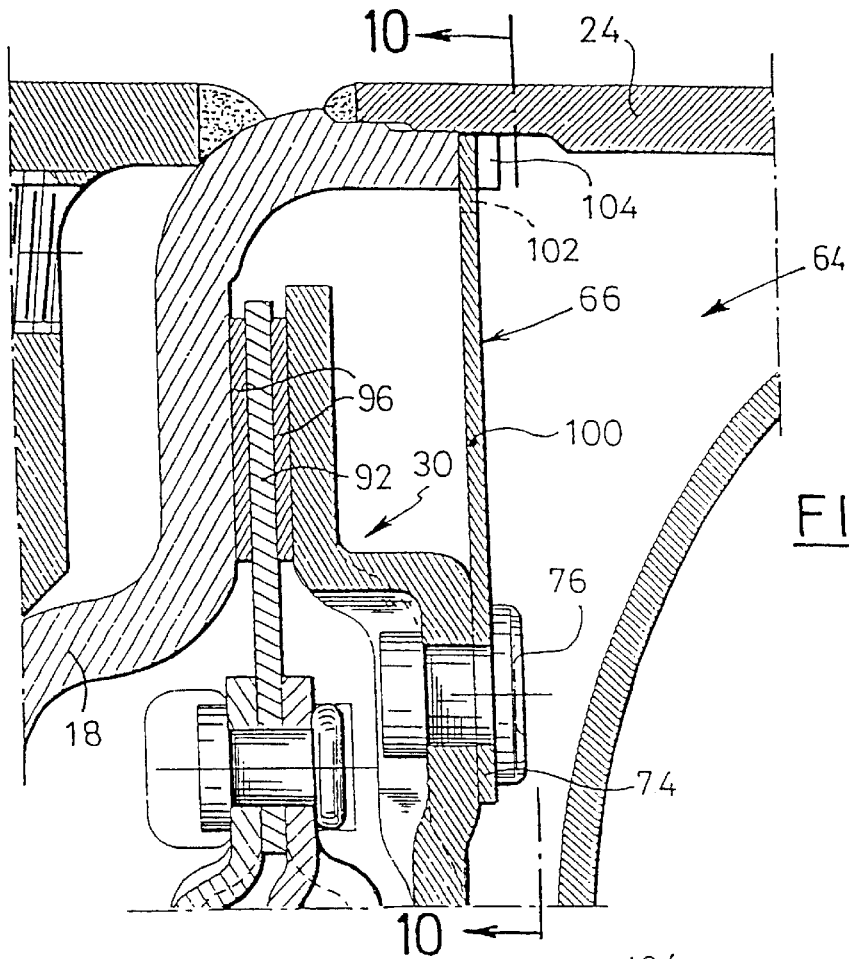
FIGS. 9 and 10 are views similar to those in FIGS. 2 and 3, but show a fifth embodiment of the invention in which the axially elastic tongues are integral with the support member.
Figure 10:
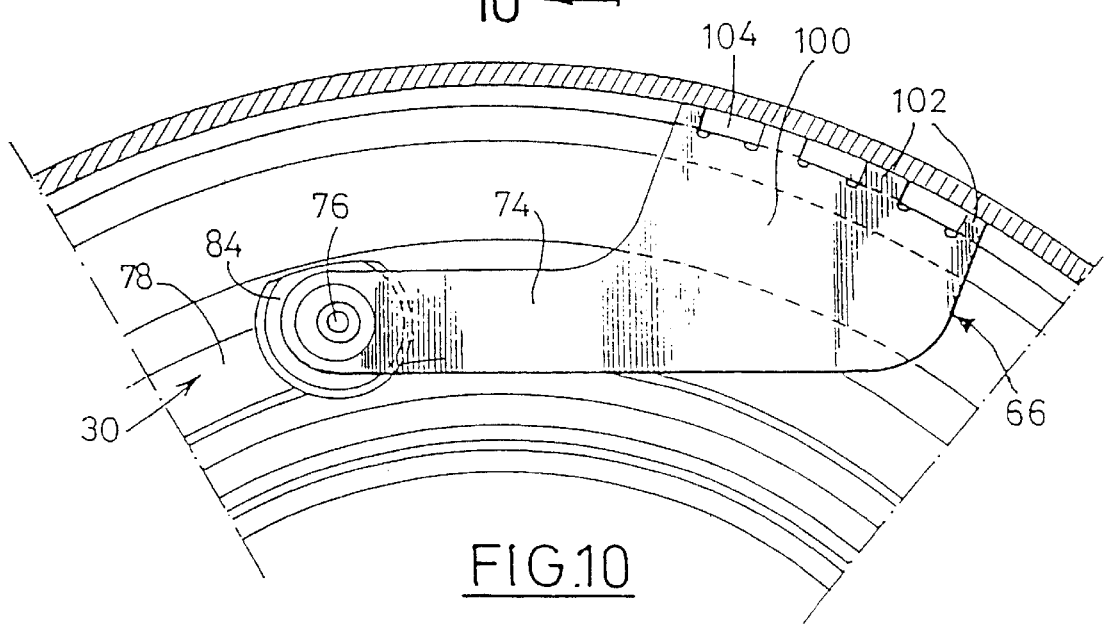

FIGS. 9 and 10 show a fifth embodiment which is similar to the fourth embodiment, but in which each axially elastic tongue 74 is integral with the transverse plate sector 100 of a support lug 66.

Thus the transverse plate sector 100 no longer includes the second fastening point 80. The radially inner periphery of the transverse plate sector 100 is extended substantially circumferentially by a tongue 74, which is extended up to a first fastening point 76, which is still situated on a convex boss 84 on the rear face 78 of the piston 30.

It will be noted that, preferably, the transverse plate sector 100 lies in the same transverse plane as the tongue 74.

Figure 11:
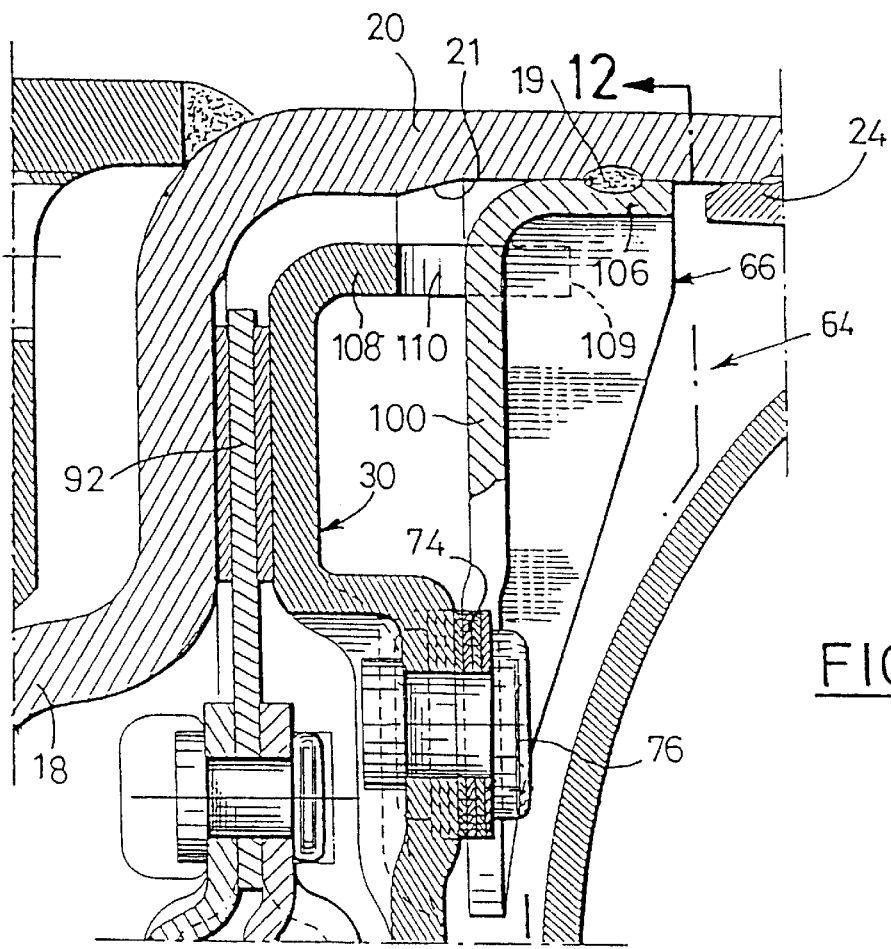
FIGS. 11 and 12 are views similar to those in FIGS. 2 and 3, but show a sixth embodiment of the invention in which the piston includes a rearwardly oriented axial skirt which is in cooperation with the support members.
Figure 12:
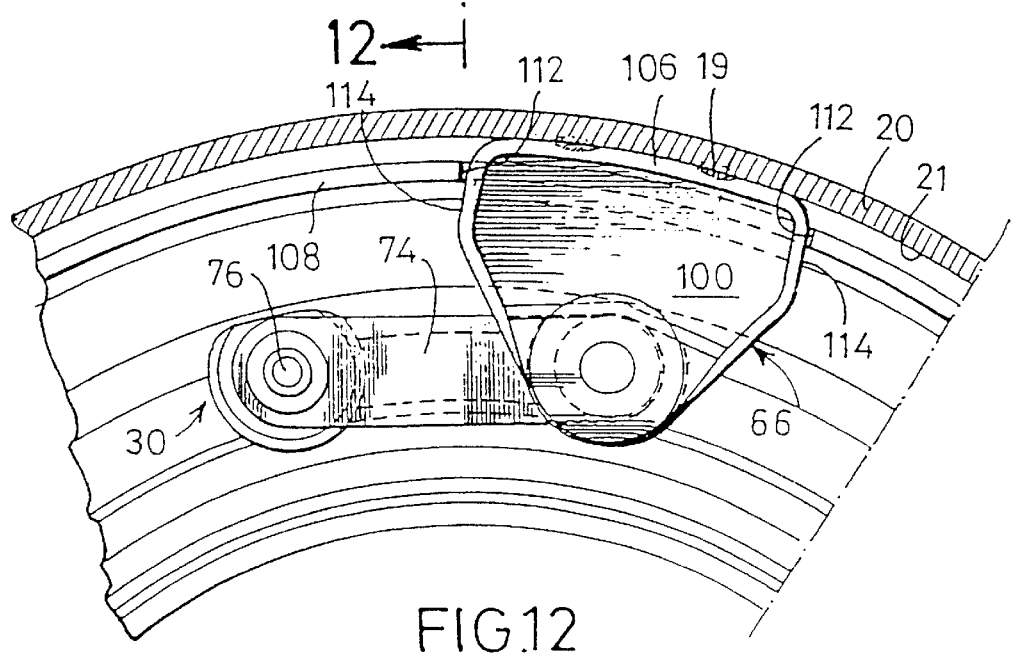
Figure 13:
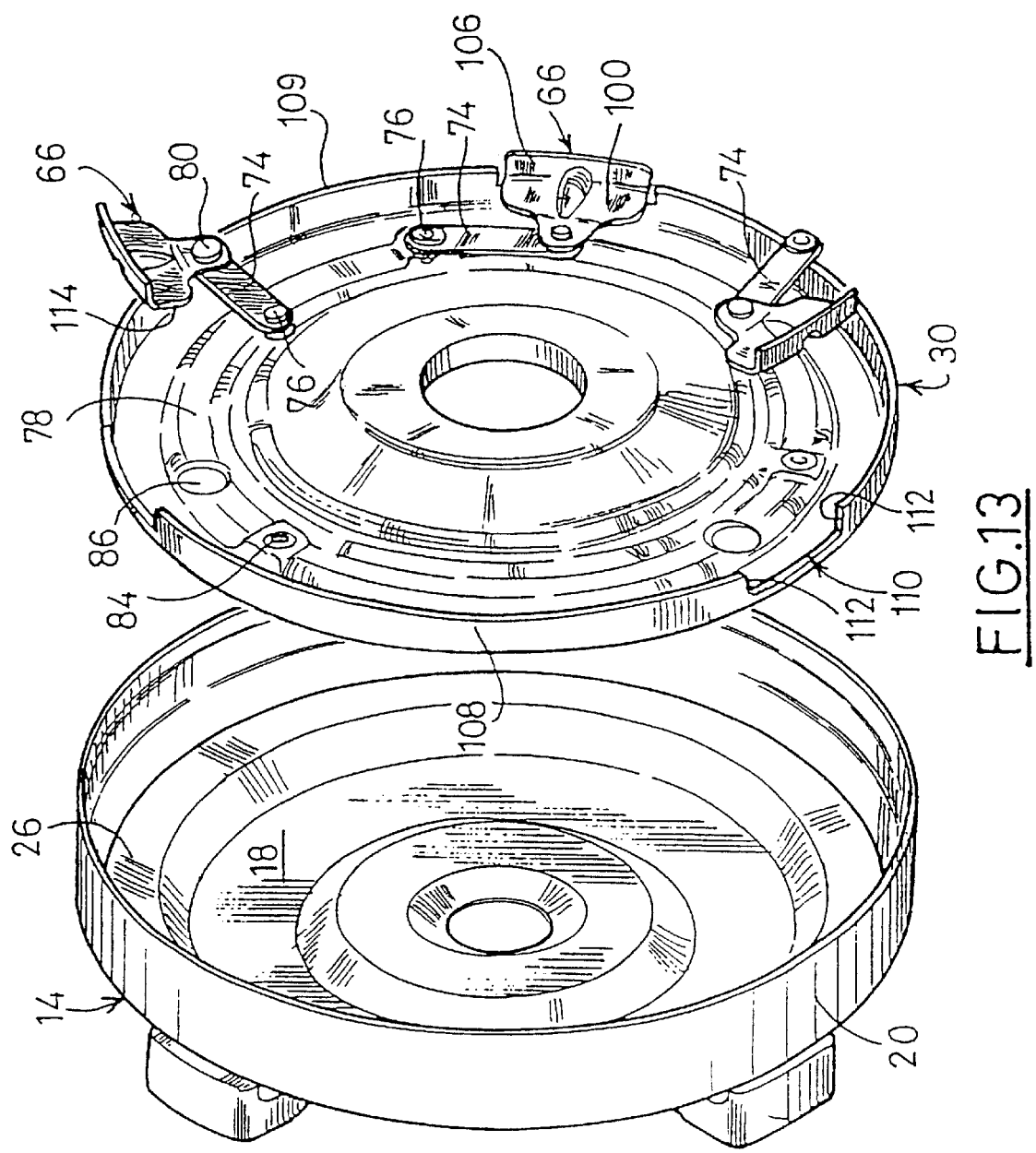
FIG. 13 is an exploded perspective view showing the main components of the sixth embodiment of the invention.

FIGS. 11, 12 and 13 show a sixth embodiment of the invention which is close to the third embodiment.

The sixth embodiment differs, in the first place, in that each support lug 66 comprises an annular crown sector 106 similar to the crown 70, which is secured, by welding at 19 in this example, on the internal face 21 of the front axial skirt 20.

In the second place this embodiment is different in that the piston 30 includes at its outer periphery an axial skirt 108 which extends towards the rear.

The free rear end 109 of the axial skirt 108 of the piston has notches 110 facing each support lug 66.

The circumferential terminal edges 112 of each notch 110 are arranged to come into abutment against the radial edges 114 of each transverse plate sector 100.

It will be noted that the fitting of the support lugs 66 in the notches 110 is obtained with a circumferential clearance, in particular to avoid any interference with the axial displacement of the piston 30.

The circumferential terminal edges 112 of the notches 110 act as a circumferential abutment for the support lugs 66, which prevents any buckling of the axially elastic tongues 74 when a high torque is being transmitted by the assembly of the casing 12 and piston 30 that gives rise to a longitudinal compression force on the tongues 74.

In FIG. 13, the convex bosses and concave bosses 86 will be noted on the rear face of the piston 30.

Figure 14:
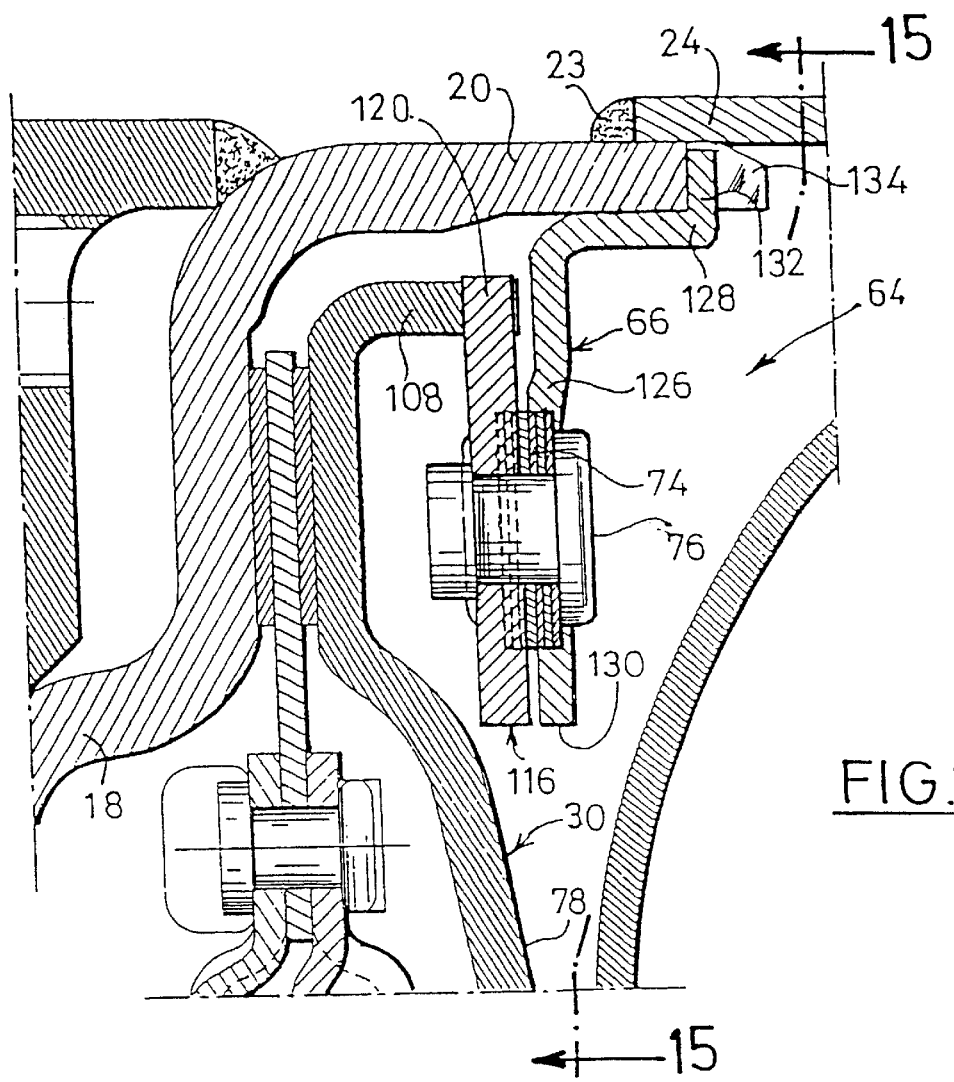
FIGS. 14 and 15 are views similar to those in FIGS. 2 and 3, but show a seventh embodiment of the invention in which the piston includes transverse intermediate plates for fastening the elastic tongues.
Figure 15:
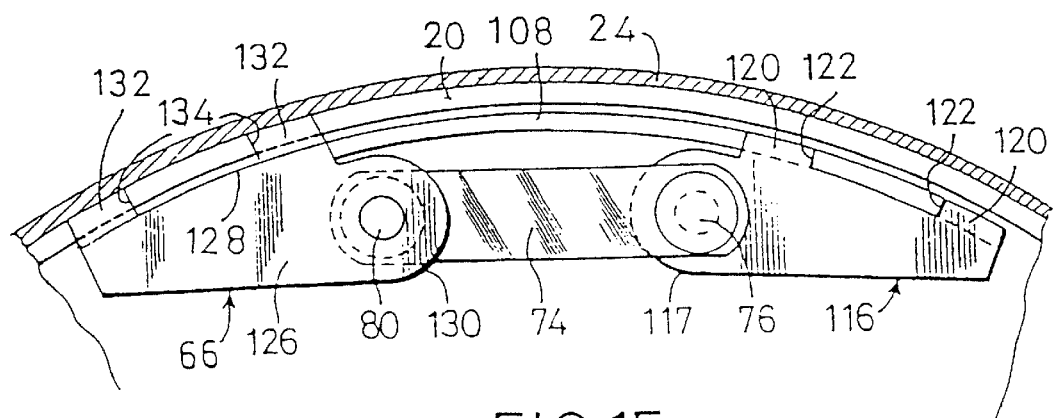

FIGS. 14 and 15 show a seventh embodiment in which the piston 30 carries, in facing relationship with its rear transverse face 78, transverse intermediate plates 116, the piston 30 also having an axial skirt 108 similar to that in the preceding embodiment.

Each transverse intermediate plate 116 includes an ear 117 which carries the first fastening point 76 for an axially elastic tongue 74.

Each intermediate transverse plate 116 has, at its outer periphery, transverse fastening lugs 120, each of which is engaged in a complementary slot 122 formed in the free rear terminal edge of the axial skirt 108 of the piston 30.

A support member 66 in the form of a lug is fixed on the axial front skirt 20 in facing relationship with each intermediate transverse plate 116, the rear axial skirt 24 being centred around the front axial skirt 20 as in the fourth embodiment.

This support lug 66 comprises a transverse plate portion 126, at the outer periphery of which there is an annular crown sector 128 which is centred internally in the front axial skirt 20. The transverse plate portion 126 has an ear 130 which carries the first fastening point 80 for the axially elastic tongue 74.

The free rear end of the annular crown sector 128 includes transverse fastening lugs 132, each of which is engaged, radially on the outside, in a complementary notch 134 formed in the free end of the front axial skirt 20.

Two transverse fastening lugs 120 and 132 are provided for each transverse intermediate plate, and for each support lug 66. This number does of course depend on the application.

By upsetting the side edges of the notches 122, 134 by cold or hot working, for example with electric heating, the metal of the axial skirt 108 of the piston 30 and that of the front axial skirt 20 of the front shell 14 respectively is caused to flow so as to enable the transverse fastening lugs 120, 132 to be axially immobilised, respectively, between the base of the notches 122, 134, and it also enables the material to reflow during plastic deformation of the side edges of the notches 122, 134. Thus the transverse intermediate plate 116 and the support lug 66 are seamed, in this example, respectively on the axial skirt 108 of the piston 30 and on the front axial skirt 20 of the front shell 14.

In another version, the front axial skirt 20 of the front shell 14 can partly surround the rear axial skirt 24 of the rear shell 16, so that the notches 134 can be formed in the axial rear skirt 24.

In a further version, the transverse fastening lugs 120, 132 are fastened by welding or adhesive bonding, respectively on the axial skirt 108 of the piston 30 and on either the front axial skirt 20 or the rear axial skirt 24 of the casing 12.

In yet another version, the annular crown sector 128 of the support lug 66 is secured by welding, for example by transparency welding of the laser type, on the front axial skirt 20 of the front shell 14.

In yet a further version, the transverse intermediate plate 116 can be welded directly on the rear face 78 of the piston 30. The transverse intermediate plate 116 accordingly has a first portion for fastening the end concerned of a set of tongues 74, and a second portion, offset axially, for fastening of the transverse intermediate plate 116 by welding.

In yet a further version, the piston 30 can also have at its outer periphery a transverse flange, which may be divided into lugs and which is directed towards the axis X–X' so that it then replaces the transverse intermediate plate 116 in that it carries the first fastening point 76 for the tongue 74.

Figure 16:
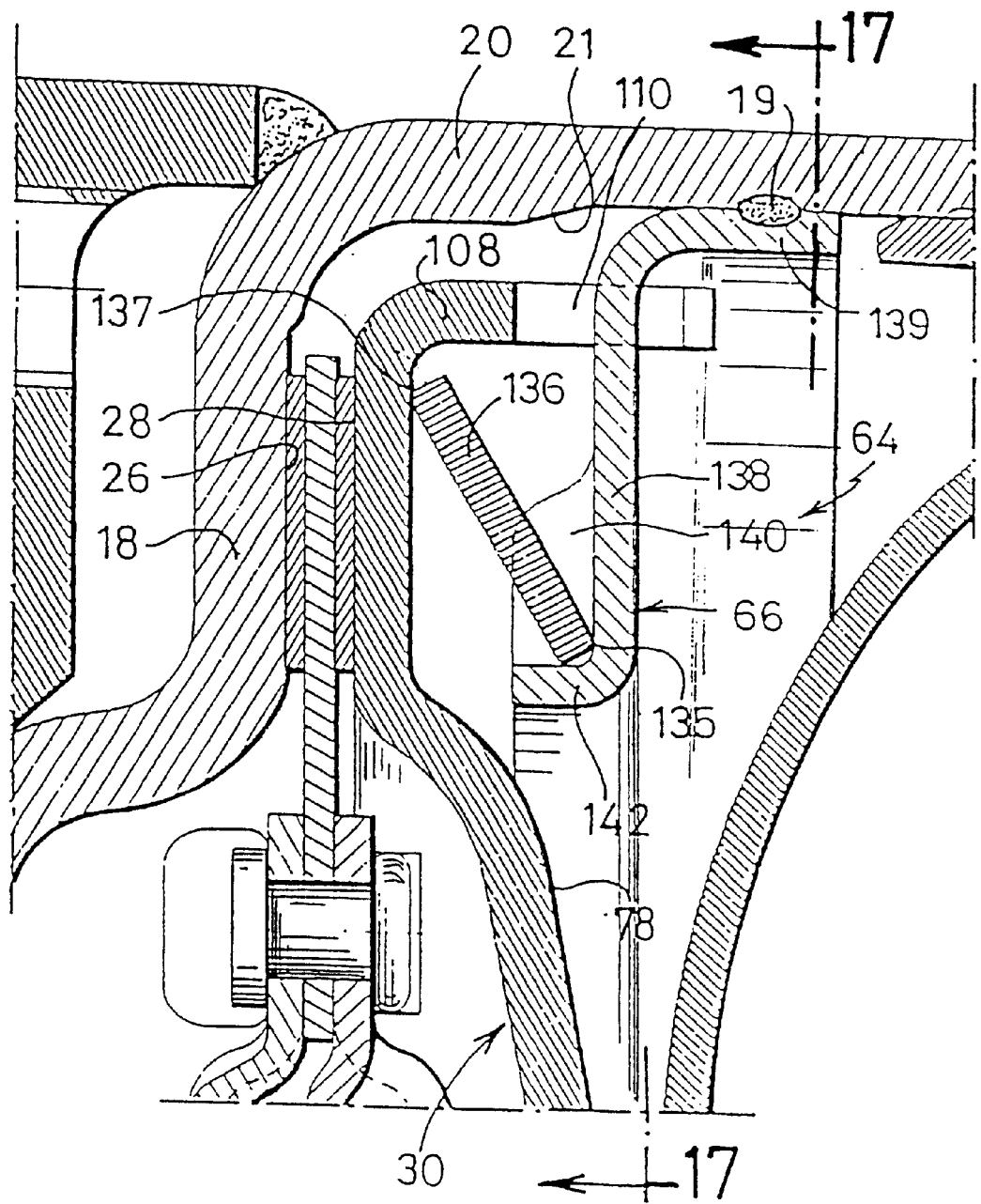
FIGS. 16 and 17 are views similar to those in FIGS. 2 and 3, but show an eighth embodiment of the invention in which the elastic device consists of compression spring sectors of the conical ring type.
Figure 17:
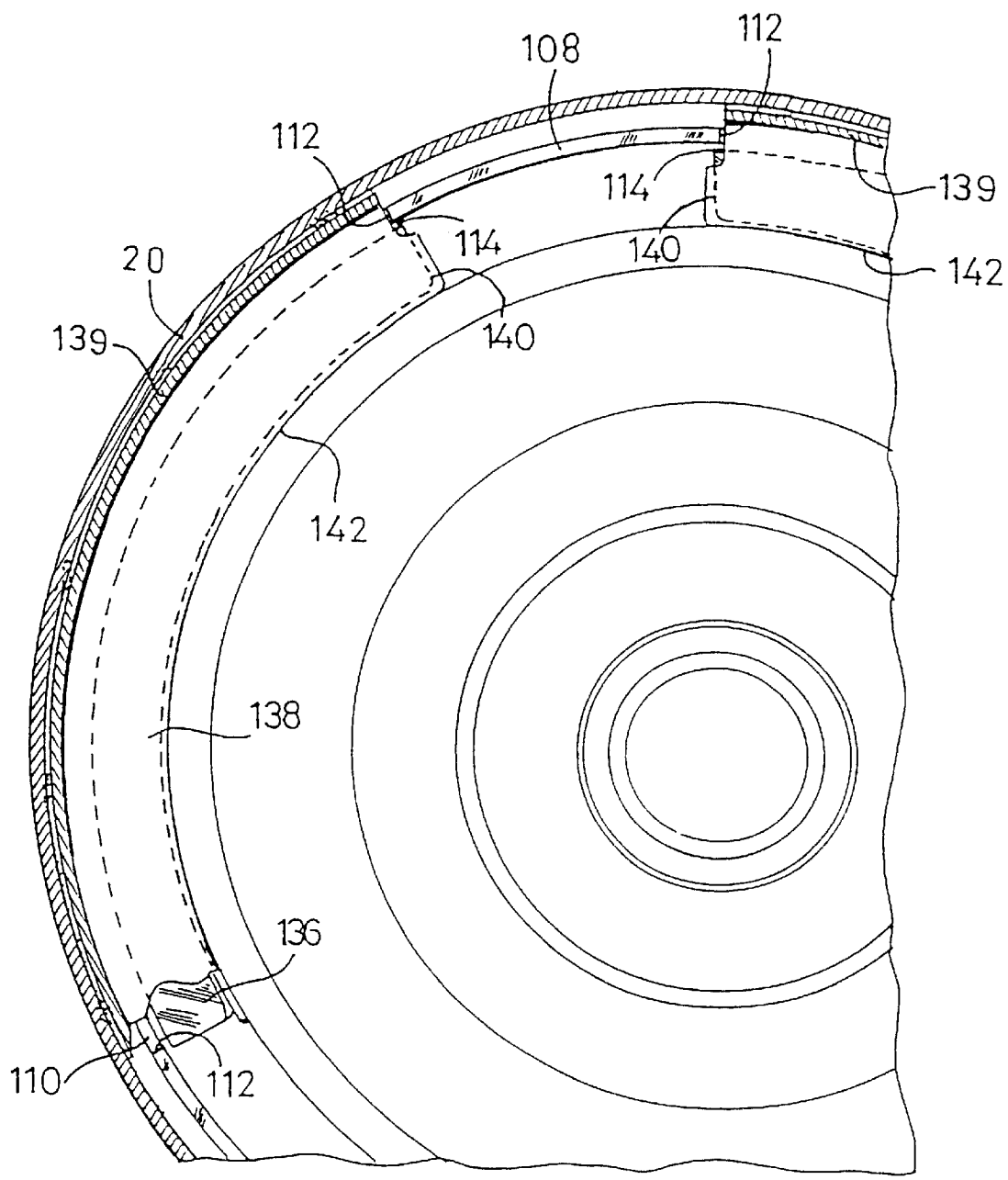

FIGS. 16 and 17 represent an eighth embodiment of the axially elastic device 64, in which the axially elastic tongues are eliminated.

In this embodiment, the elastic member consists of a plurality of circumferential sectors or portions 136 of a compression spring of the conical ring type, also referred to as a Belleville ring.

In this embodiment, the piston 30 comprises an axial skirt 108 which is oriented towards the rear and which is of a similar form to that of the piston 30 in the sixth embodiment.

The support members 66 include transverse annular plate sectors 138 which are provided at their outer periphery with an annular rear axial crown sector 139, and at their inner periphery with an annular front axial crown sector 142.

Each support member 66 is fixed to the internal wall 21 of the axial front skirt 20 through the outer wall of its annular rear axial crown sector 139, in this case by welding at 19.

As in the sixth embodiment, the axial skirt 108 of the piston 30 has notches 110 in facing relationship with each support member 66, so that the piston 30 is coupled in rotation with the support members 66 with a circumferential clearance. The circumferential terminal edges 112 of the notches 110 are therefore able to come into abutment against the circumferential terminal edges 114 of each transverse plate sector 138.

The piston 30 is driven by cooperation of the notches 110 with the support member 66.

Each spring sector 136 bears through its circular rear axial internal terminal edge 135 on the transverse front face of the transverse plate sector 138, and through its circular front axial outer terminal edge 137 on the rear transverse face 78 of the piston 30, preferably facing the surfaces 26, 28.

Each spring sector 136 is retained radially at its inner periphery by the annular front axial crown sector 142 of the support member 66. It is also retained circumferentially by a pair of circumferential abutments 140, which in this example consist of flanges extending axially forward from the circumferential terminal edges 114 of each transverse plate sector 138.

It will be noted that, besides exerting an axial preloading force on the piston 30 in the direct of bridging of the clutch, the compression spring 136 enables noise in the driving of the piston 30 by the support members 66, due to the circumferential clearance, to be reduced because of the friction that exists between the piston 30 and the compression spring 136.

Figure 18:
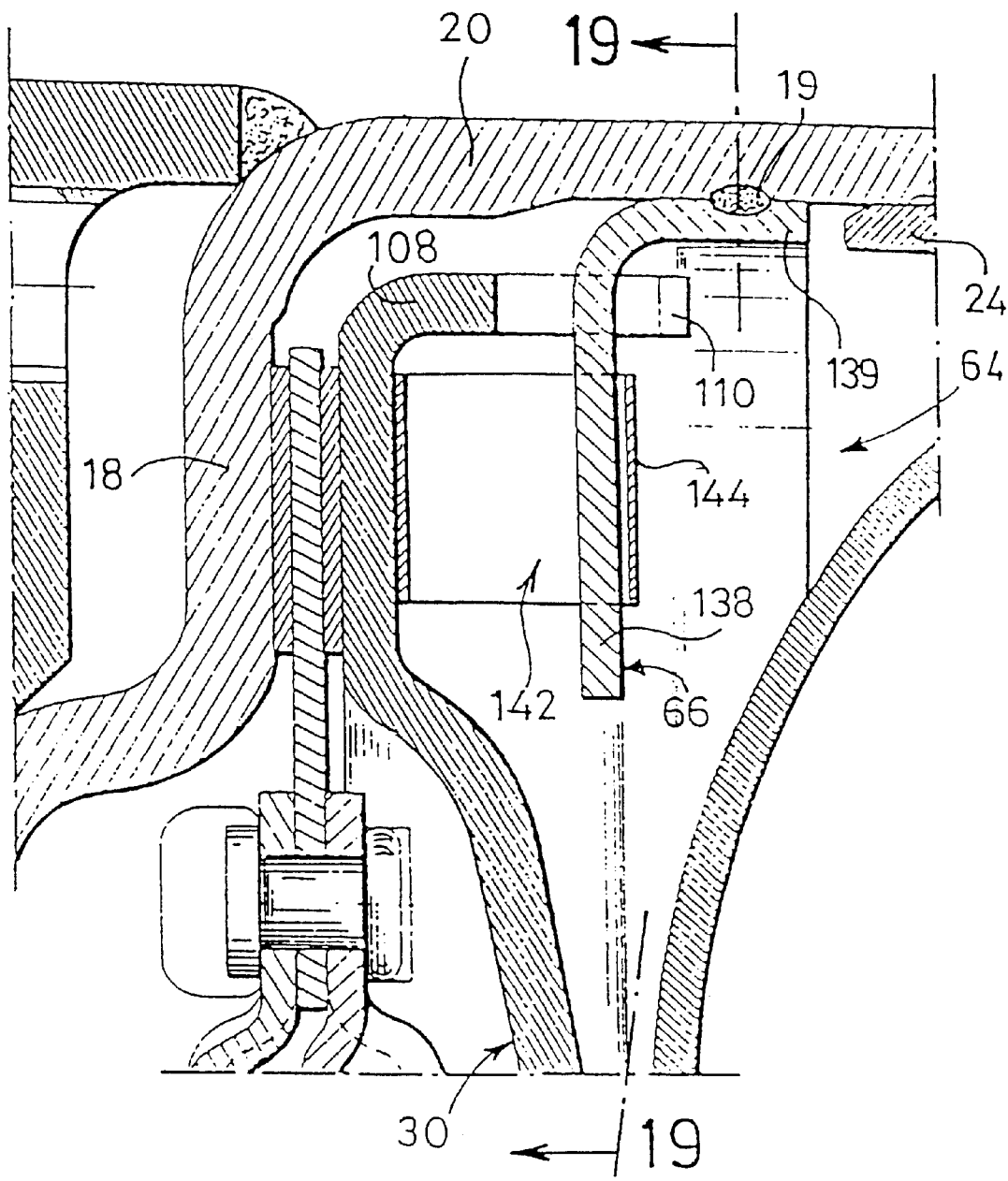
FIGS. 18 and 19 are views similar to those in FIGS. 2 and 3, but show a ninth embodiment of the invention in which the spring sectors are of the corrugated type.
Figure 19:
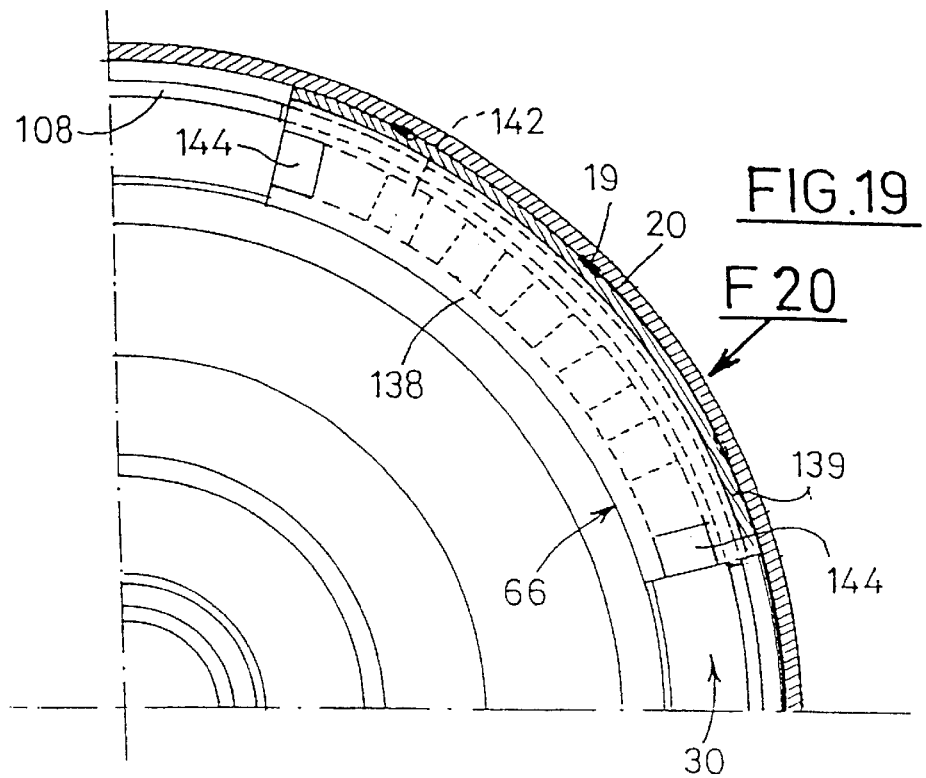
Figure 20:
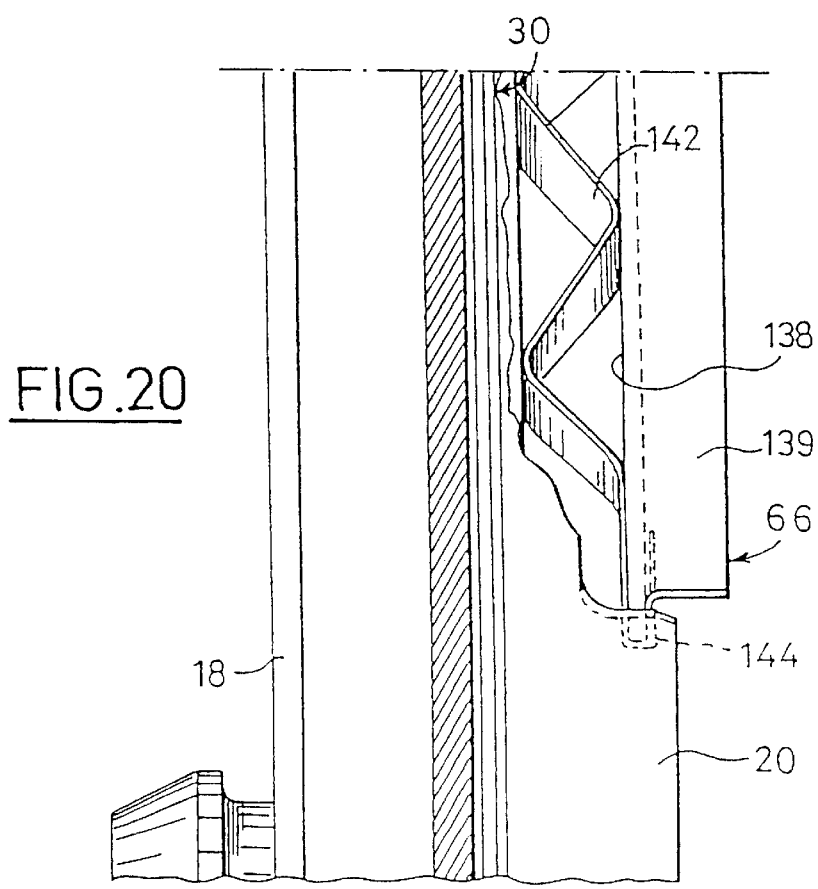
FIG. 20 is a top plan view in the direction of the arrow F20 in FIG. 19, partly cut away, and is a scrap view showing the ninth embodiment of the invention.

FIGS. 18, 19 and 20 represent a ninth embodiment of the axially elastic device which is similar to the preceding embodiment, and in which the spring sectors of the conical ring type are replaced by compression spring sectors 142 of the corrugated type.

In this embodiment, the support members 66 are similar to those in the preceding embodiment, but they do not have any flanges at their circumferential terminal edges, nor do they have any radially internal front annular axial crown.

The piston 30 is identical to that in the preceding embodiment.

Each spring sector or portion 142 of the corrugated type includes at its ends retaining lugs 144 which are bent around circumferential terminal edges of each transverse plate sector 138, so that the spring sectors 142 are coupled both in rotation and axially with the transverse plate sectors 138. The elastic gripping of the lugs 144 around the transverse plate 138 also retains the springs 142 radially.

Figure 21:
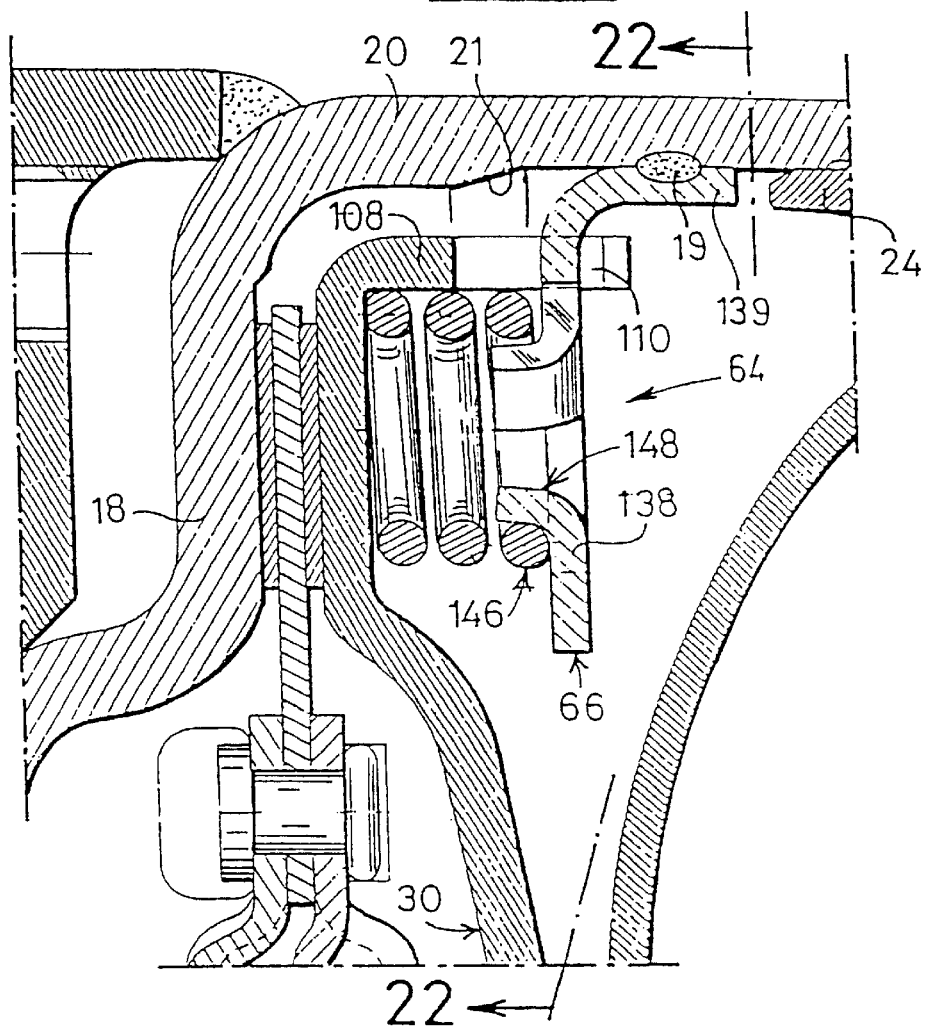
FIGS. 21 and 22 are views similar to those in FIGS. 2 and 3, but show a tenth embodiment of the invention in which the spring sectors are replaced by compression springs of the helical type.
Figure 22:
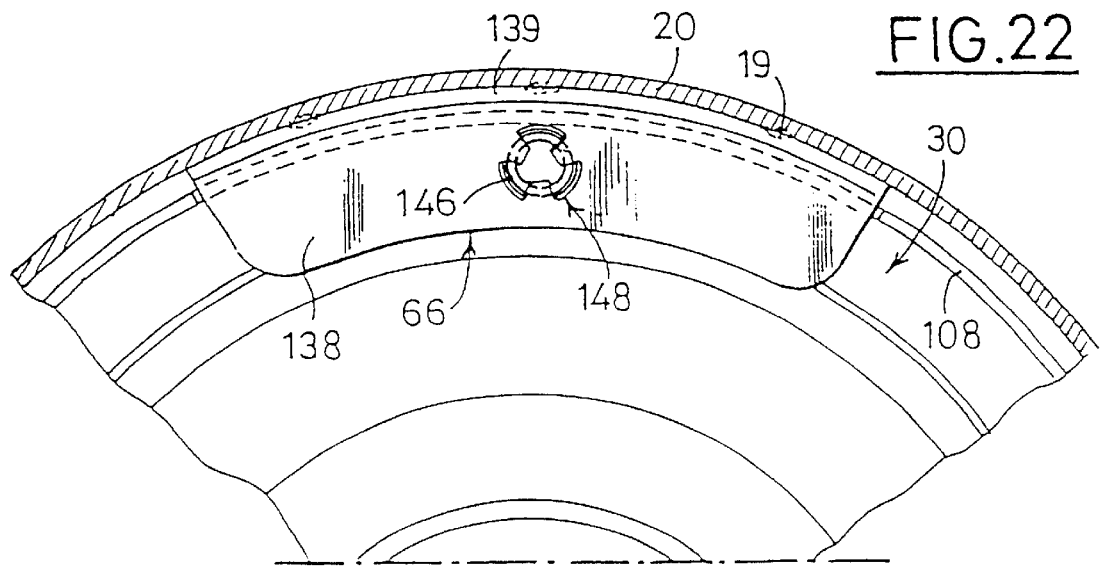

FIGS. 21 and 22 show a tenth embodiment similar to the preceding embodiment, in which each spring sector of the corrugated type has been replaced by a compression spring of the helical type 146.

The piston 30 and the support members 66 are similar to those in the preceding embodiment.

However, each transverse plate sector 138 includes a retaining pad 148 which is formed on its front face from which it projects, substantially in its centre and in this example by stamping out in the press, whereby to immobilise the helical spring 146 transversely. Each helical spring 146 may with advantage be hooked axially on its pad 148, with a view to making it easier to fit.

Figure 23:
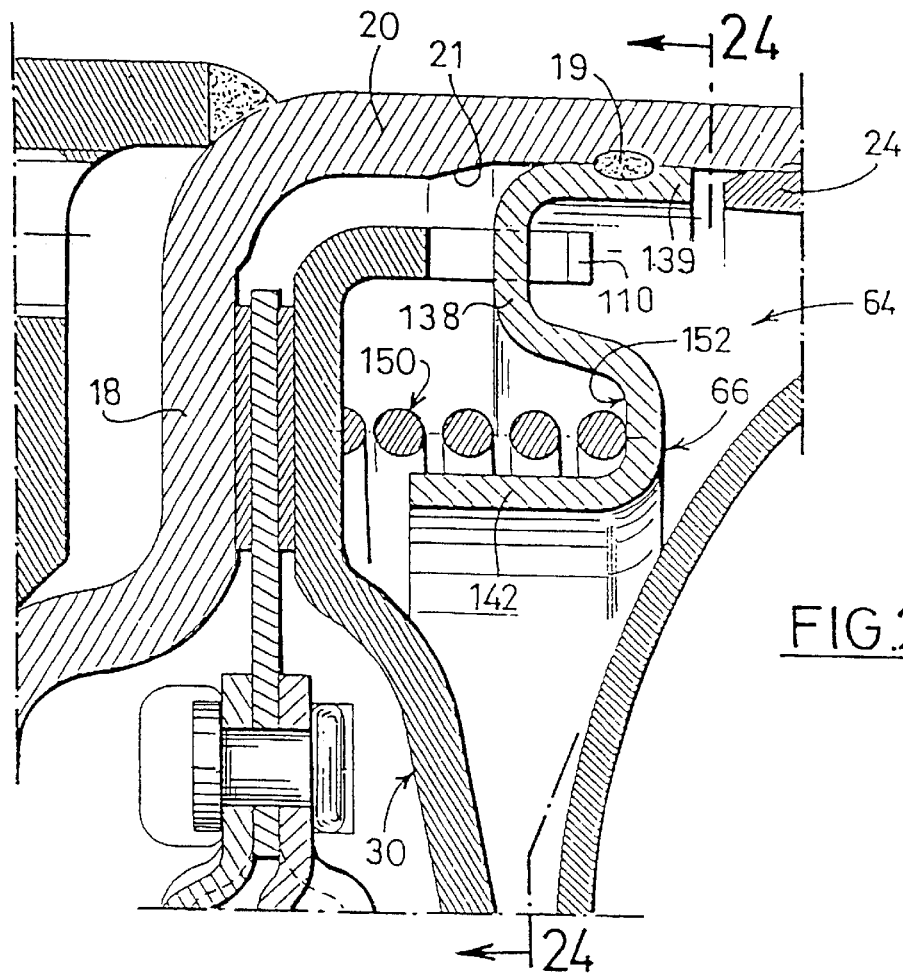
FIGS. 23 and 24 are views similar to those in FIGS. 2 and 3, but show an eleventh embodiment of the invention in which the elastic device consists of a single compression spring of large diameter and of the helical type.
Figure 24:
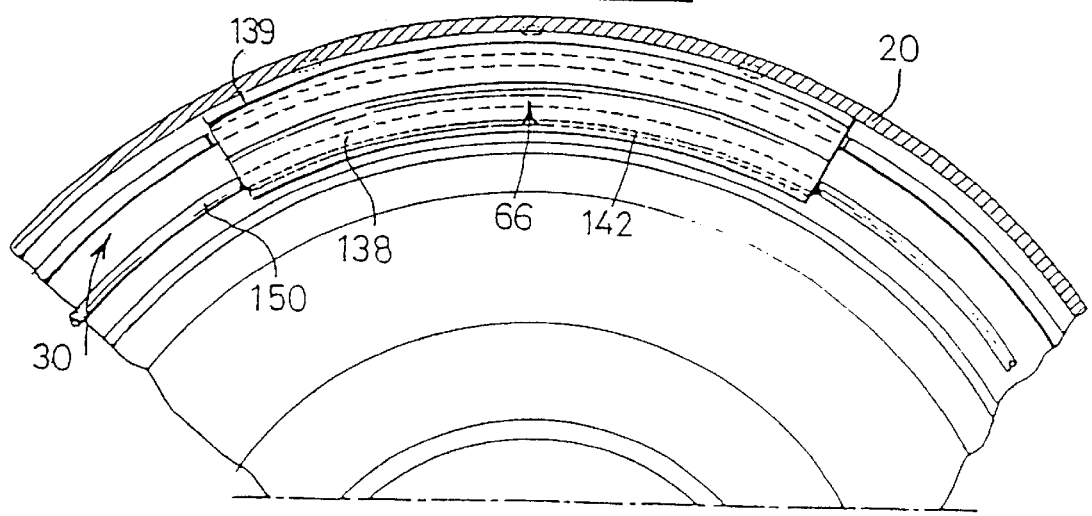

FIGS. 23 and 24 show an eleventh embodiment which is substantially similar to the eighth embodiment, and in which the spring sectors of the conical ring type have been replaced by a single compression spring 150 of the helical type.

It will be noted that the transverse plate portion 138 of, the support member 66 differs from the transverse plate portion in the eighth embodiment in that it includes on its front face a centring channel 152, which receives the rear axial end of the helical spring 150.

It will be noted that the annular rear axial crown sector 139, the transverse plate portion 138, the centring channel 152 and the annular front axial crown sector 142 give the support member 66 an S-shaped profile.

The annular front axial crown sector 142 retains the helical spring 150 radially towards the axis.

By way of modification, the single spring 150 of large diameter may be a Belleville ring or a corrugated ring in one piece.

Figure 25:
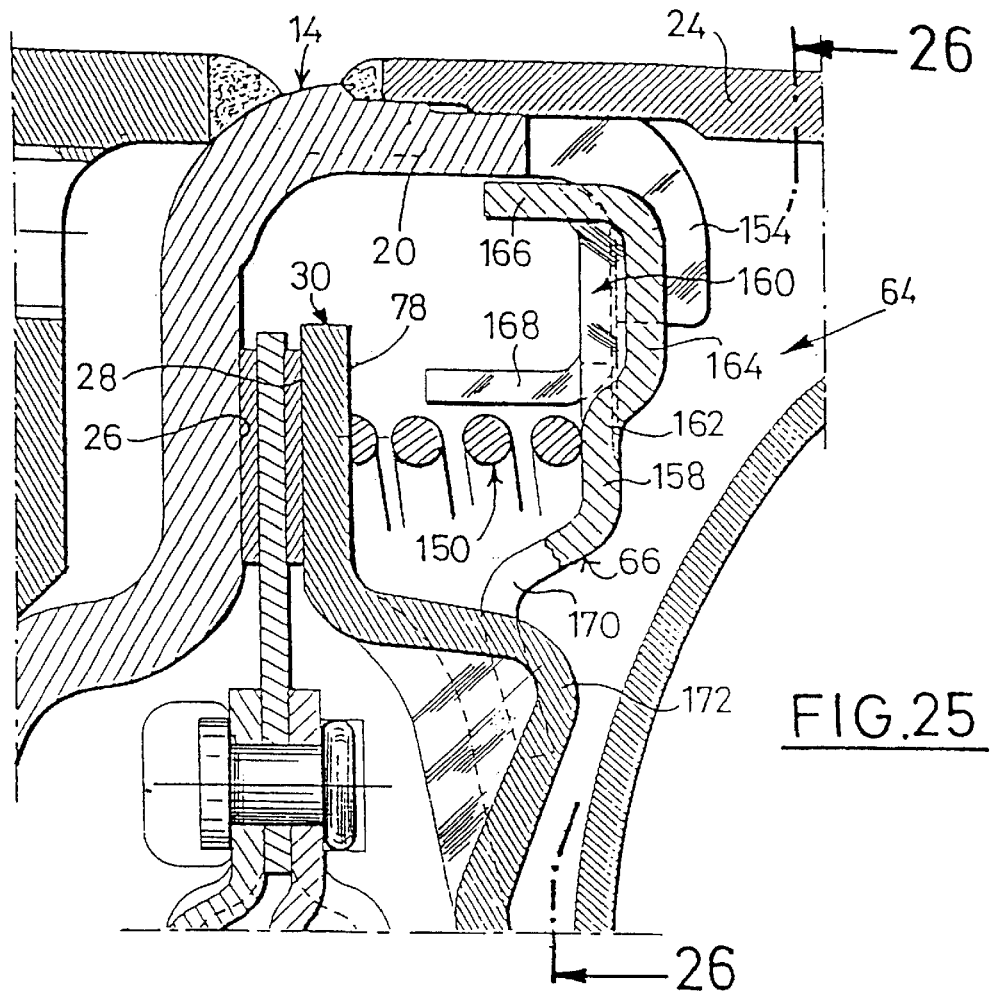
FIGS. 25 and 26 are views similar to those in FIGS. 2 and 3, but show a twelfth embodiment of the invention in which the axially elastic device is mounted in the casing by a bayonet type connection.
Figure 26:
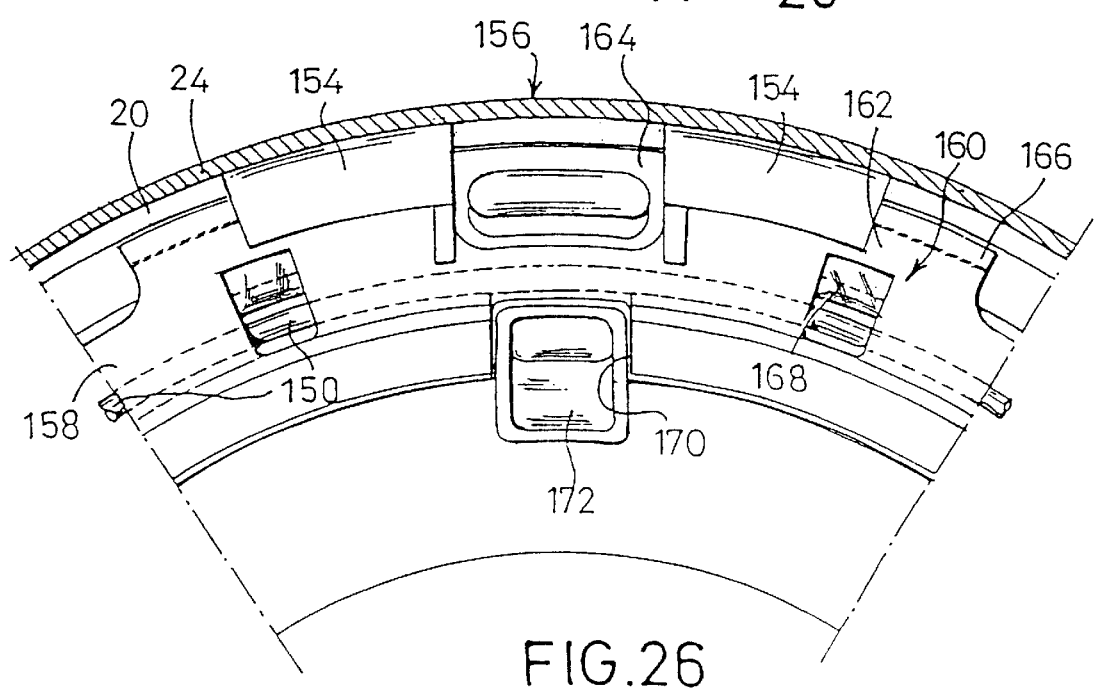
Figure 27:
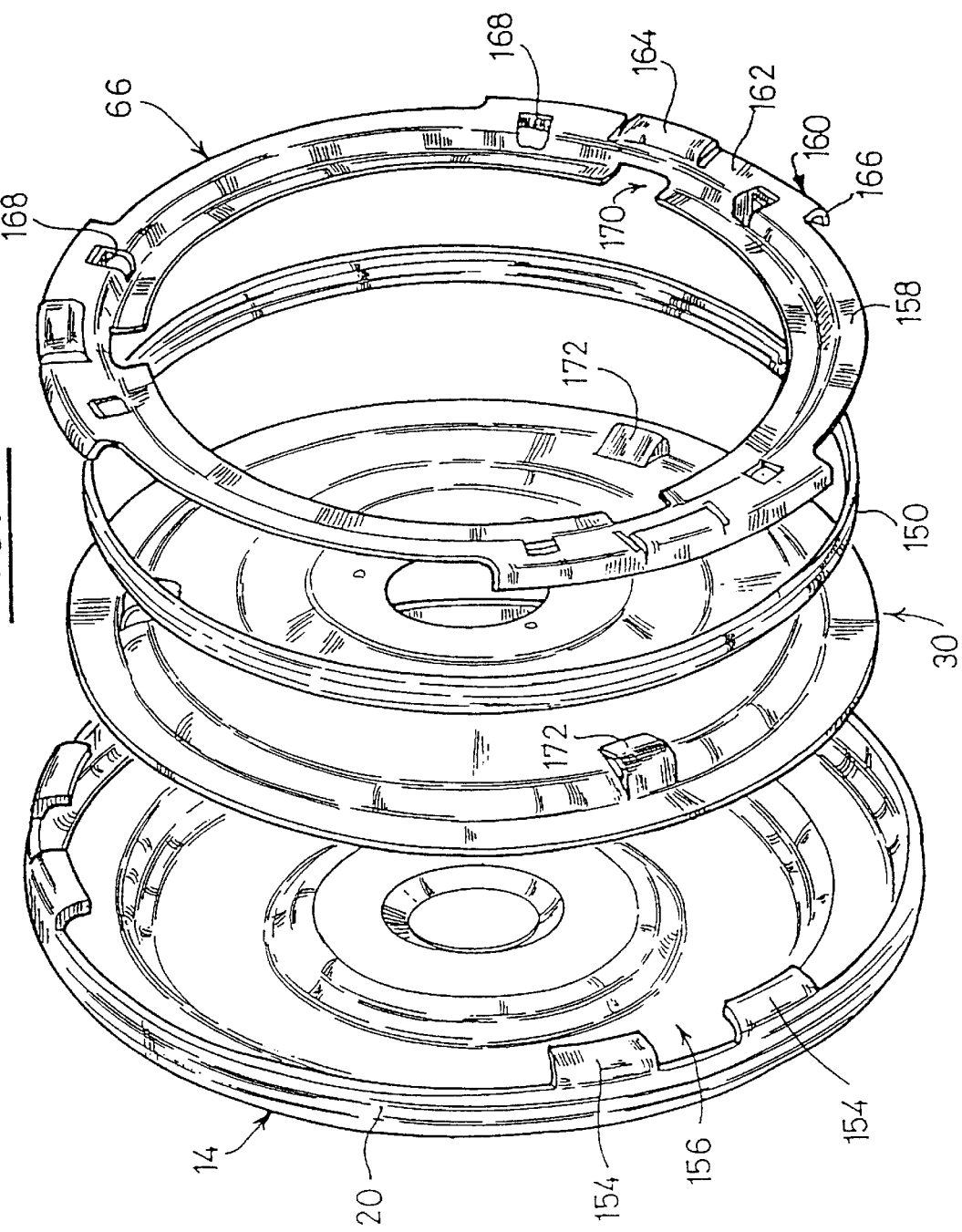
FIG. 27 is an exploded perspective view showing the main components of the twelfth embodiment of the invention.

FIGS. 25, 26 and 27 show a twelfth embodiment in which the mounting by which the support member 66 is supported in the casing 12 is of the bayonet type.

In this embodiment, the annular front axial skirt 20 of the front shell 14 includes at its free rear end transverse lugs 154, each of which extends radially towards the axis.

These transverse lugs 154 are spaced apart circumferentially at regular intervals and in pairs, of which there are three in this example, in such a way that two transverse lugs 154 define a recess 156 between them.

The support member 66 comprises a transverse annular plate portion 158 which is axially stepped.

The transverse annular plate portion 158 has at its outer periphery transverse lugs 160 of which there are three in this example, and which are spaced apart circumferentially at regular intervals.

Each transverse lug 160 includes, projecting from its rear face 162, a boss 164 which is arranged to fit in a recess 156. The transverse lugs 160 also include at their outer periphery an axial skirt 166 oriented towards the rear.

The transverse annular plate portion 158 also includes, projecting on its front face, guide lugs 168 which in this example are formed by stamping out in the press, and, on its inner periphery, retaining notches 170.

The piston 30 includes, projecting on its rear face 78 and facing each retaining notch 170, a retaining pad 172.

A compression spring 150, which in this example is of the helical type and which is of large diameter, is interposed between the piston 30 and the transverse annular plate portion 158. This spring 150 is in axial abutment through its rear end on the front face of the transverse annular plate portion 158, and is in axial abutment through its front end on the rear face 78 of the piston 30.

In this example, the spring 150 lies facing the surfaces 26 and 28, and it is retained radially on the side of the support member 66 by the guide lugs 168 and by an appropriate stepped configuration of the transverse annular plate portion 158.

The piston 30, spring 150 and support member 66 are held in the casing 12 by a coupling of the bayonet type. In consequence it is sufficient to compress the spring 150 between the piston 30 and the transverse annular plate portion 158 by displacing the transverse annular plate portion 158 axially forwards. Then, when the transverse lugs 154 of the front axial skirt 20 have been passed axially, a rotational movement is applied to the transverse annular plate portion 158 so that each boss 164 of a transverse lug 160 of the transverse annular plate portion 150 comes into engagement in a recess or notch 156 in the axial front skirt 20.

In accordance with the properties of the bayonet type fitting, the return force of the spring 150 maintains the transverse annular plate portion 158 in the casing 12 and the piston 30 against the transverse front wall 18 of the front shell 14, preventing any danger of accidental disconnection.

Various embodiments of the invention are described above. This description is of course not restrictive of the invention, and other embodiments, not described here, may be envisaged. It is in particular possible to combine some of these embodiments together.

What is claimed is:

1. Hydrokinetic coupling apparatus (10), for a motor vehicle, which comprises a casing (12) having an annular axial wall (13) and a transverse front wall (18), in which the casing (12) is arranged to be coupled in rotation to a driving shaft, that includes a turbine wheel (40) mounted inside the casing (12) and fixed to a hub (46) which is arranged to be coupled in rotation to a driven shaft, in which the rear face of the transverse front wall (18) of the casing (12) includes a first surface (26), in which a lock-up clutch is interposed operatively between the turbine wheel (40) and the transverse front wall (18) so as to couple them together releasably, and in which the lock-up clutch comprises at the rear a piston (30) which is movable axially with respect to the transverse front wall (18) of the casing (12), and which carries on its front face a second surface (28) facing the first surface (26), wherein the piston (30) is coupled in rotation to the annular axial wall (13) of the casing (12) through an axially elastic device (64), wherein the second surface (28) is adjacent the outer periphery of the piston (30), and wherein the axially elastic device (64) comprises at least one support member (66) coupled in rotation and along an axial direction to the axial annular wall (13) of the casing (12), said at least one support member (66) comprising a transverse plate element (68, 100, 126, 138, 158), and comprises at least one elastic member (74, 136, 142, 146, 150) which is interposed axially between the piston (30) and the transverse plate element (68, 100, 126, 138, 158) of the support member (66), and wherein the piston (30) includes means (74, 110, 172) for coupling said piston (30) in rotation with the support member (66).

2. Apparatus (10) according to the preceding claim 1, characterised in that the mean radius of intervention of the elastic member (74, 136, 142, 146, 150) is smaller than the external radius of the second surface (28).

3. Apparatus (10) according to claim 2, characterised in that the axially elastic device (64) comprises a plurality of support members (66) spaced apart circumferentially, in particular at regular intervals.

4. Apparatus (10) according to claim 2, characterised in that the axially elastic device (64) comprises a single support member (66), the transverse plate portion (68, 158) of which constitutes an annular ring.

5. Apparatus (10) according to claim 1, characterised in that the axially elastic device (64) comprises axially elastic tongues (74), the opposed ends of which are secured respectively on the piston (30) and on the transverse plate portion (68, 100, 126) of the support member (66) or members.

6. Apparatus (10) according to the preceding claim 1, characterised in that the tongues (74) exert a preloading force on the piston (30) in the direction of locking of the clutch.

7. Apparatus (10) according to the preceding claim 1, characterised in that the magnitude of the preloading force is adjusted according to the axial positioning of the transverse plate portion (68, 100, 126).

8. Apparatus (10) according to claim 5, characterised in that the tongues (74) tend to retain the piston (30) in the unlocked position of the clutch.

9. Apparatus (10) according to claim 5, characterised in that the tongues (74) are spaced apart circumferentially at regular intervals.

10. Apparatus (10) according to claim 5, characterised in that the tongues (74) are oriented tangentially.

11. Apparatus (10) according to claim 5, characterised in that each tongue (74) includes a first point (76) for fastening on the rear face (78) of the piston (30).

12. Apparatus (10) according to the preceding claim 1, characterised in that the first fastening point (76) is defined on a convex boss (84) on the rear face (78) of the piston (30).

13. Apparatus (10) according to claim 12, characterised in that the tongues (74) are formed integrally with the transverse plate portion or portions (100) of the or the respective support member (66).

14. Apparatus (10) according to claim 12, characterised in that each tongue (74) has a second point (80) for fastening on the front face (82) of the transverse plate portion or portions (68, 100, 126) of the or the respective support member (66).

15. Apparatus (10) according to the preceding claim 1, characterised in that the second fastening point (80) of the tongue (74) is in facing relationship with a concave boss (86) on the rear face (78) of the piston (30).

16. Apparatus (10) according to claim 15, characterised in that the transverse plate portion (68) of the support member (66) is formed with cut-outs (72) in facing relationship with a first fastening point (76) of each tongue (74), the second fastening point (80) of which is situated in the vicinity of the circumferential terminal edge (73) of the cut-out (72).

17. Apparatus (10) according to claim 1, characterised in that the piston (30) includes, in facing relationship with its rear face (78), at least one transverse intermediate plate (116) which is fixed through its outer periphery on a peripheral annular skirt (108) of the piston (30), whereby the elastic member (74) is operatively interposed between each transverse intermediate plate (116) and each support member (66).

18. Apparatus (10) according to claim 1, characterised in that the casing (12) comprises a front shell (14) and a rear shell (16), each of which includes an axial skirt (20, 24), the two axial skirts (20, 24) defining the axial annular wall (13) of the casing (12).

19. Apparatus (10) according to claim 18, characterised in that the transverse plate portion (100) of each support member (66) is fixed directly on the free rear end of the axial skirt (20) of the front shell (14), or on the free front end of the axial skirt (24) of the rear shell (16).

20. Apparatus (10) according to claim 18, characterised in that each support member (66) comprises an annular axial crown (70) or annular axial crown sectors (106, 128, 139), which are oriented towards the rear from the outer periphery of the transverse plate portion (68, 100, 126, 138), for coupling the support member (66) to the axial annular wall (13) of the casing (12).

21. Apparatus (10) according to claim 20, characterised in that the crown (70) or the crown sector (106, 128, 139) of each support member (66) is fixed on the axial skirt (20) of the front shell (14) or on the axial skirt (24) of the rear shell (16).

22. Apparatus (10) according to claim 21, characterised in that a double-sided annular friction disc (92) is arranged to be gripped between the first and second surfaces (26, 28), and in that a torsion damper (90) is interposed operatively between the annular friction disc (92) and the hub (46) of the turbine (40).

* * * * *